(12) United States Patent
Wheatley et al.

(10) Patent No.: US 8,807,774 B2
(45) Date of Patent: *Aug. 19, 2014

(54) SEMISPECULAR HOLLOW BACKLIGHT WITH GRADIENT EXTRACTION

(71) Applicant: 3M Innovative Properties Company, St. Paul, MN (US)

(72) Inventors: John A. Wheatley, Lake Elmo, MN (US); Tao Liu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/024,926

(22) Filed: Sep. 12, 2013

(65) Prior Publication Data

US 2014/0009912 A1    Jan. 9, 2014

Related U.S. Application Data

(63) Continuation of application No. 13/124,951, filed as application No. PCT/US2009/060308 on Oct. 12, 2009, now Pat. No. 8,591,052.

(60) Provisional application No. 61/108,606, filed on Oct. 27, 2008.

(51) Int. Cl.
*G09F 13/04* (2006.01)

(52) U.S. Cl.
CPC .................................... *G09F 13/04* (2013.01)
USPC ........................................ 362/97.1; 362/633

(58) Field of Classification Search
USPC ........................................................ 362/97.1
See application file for complete search history.

(56) References Cited

U.S. PATENT DOCUMENTS

| | | |
|---|---|---|
| 5,337,068 A | 8/1994 | Stewart et al. |
| 5,751,388 A | 5/1998 | Larson |
| 5,793,456 A | 8/1998 | Broer et al. |
| 5,825,543 A | 10/1998 | Ouderkirk et al. |
| 5,845,038 A | 12/1998 | Lundin et al. |
| 5,867,316 A | 2/1999 | Carlson et al. |
| 5,882,774 A | 3/1999 | Jonza et al. |
| 5,976,686 A | 11/1999 | Kaytor et al. |
| 6,122,103 A | 9/2000 | Perkins et al. |
| 6,210,785 B1 | 4/2001 | Weber et al. |
| 6,367,941 B2 | 4/2002 | Lea et al. |
| 6,673,425 B1 | 1/2004 | Hebrink et al. |
| 6,762,743 B2 | 7/2004 | Yoshihara et al. |
| 6,783,349 B2 | 8/2004 | Neavin et al. |

(Continued)

FOREIGN PATENT DOCUMENTS

| | | |
|---|---|---|
| CN | 1418304 | 5/2003 |
| EP | 1 653 149 | 3/2006 |

(Continued)

*Primary Examiner* — Mary Ellen Bowman
(74) *Attorney, Agent, or Firm* — Robert V. Heiti

(57) ABSTRACT

A backlight that includes a front reflector and a back reflector that form a hollow light recycling cavity including an output surface is disclosed. The backlight also includes a semi-specular element, and a light extraction element disposed within the hollow cavity. The light extraction element has a gradient specularity. The backlight also includes one or more light sources disposed to inject light into the hollow light recycling cavity, where the one or more light sources are configured to inject light over a limited angular range.

20 Claims, 5 Drawing Sheets

(56) References Cited

U.S. PATENT DOCUMENTS

| | | | |
|---|---|---|---|
| 6,845,212 B2 | 1/2005 | Gardineri et al. |
| 6,893,135 B2 | 5/2005 | Wright et al. |
| 6,905,220 B2 | 6/2005 | Wortman et al. |
| 7,223,005 B2 | 5/2007 | Lamb et al. |
| 7,229,198 B2 | 6/2007 | Sakai et al. |
| 7,285,802 B2 | 10/2007 | Ouderkirk et al. |
| 7,296,916 B2 | 11/2007 | Ouderkirk et al. |
| 7,329,982 B2 | 2/2008 | Conner et al. |
| 7,373,273 B2 | 5/2008 | Pesenti |
| 7,436,469 B2 | 10/2008 | Gehlsen et al. |
| 7,446,827 B2 | 11/2008 | Ko et al. |
| 7,525,126 B2 | 4/2009 | Leatherdale et al. |
| 7,604,381 B2 | 10/2009 | Hebrink et al. |
| 7,773,834 B2 | 8/2010 | Ouderkirk et al. |
| 7,997,771 B2 | 8/2011 | Epstein et al. |
| 2002/0159019 A1 | 10/2002 | Pokorny et al. |
| 2004/0219338 A1 | 11/2004 | Hebrink et al. |
| 2005/0135117 A1 | 6/2005 | Lamb et al. |
| 2006/0083024 A1 | 4/2006 | Pesenti |
| 2006/0124918 A1 | 6/2006 | Miller et al. |
| 2006/0193577 A1 | 8/2006 | Ouderkirk et al. |
| 2006/0257678 A1 | 11/2006 | Benson, Jr. et al. |
| 2006/0262555 A1 | 11/2006 | Yi et al. |
| 2007/0047262 A1 | 3/2007 | Schardt et al. |
| 2007/0183038 A1 | 8/2007 | Hwang et al. |
| 2007/0257266 A1 | 11/2007 | Leatherdale et al. |
| 2007/0257270 A1 | 11/2007 | Lu et al. |
| 2007/0258241 A1 | 11/2007 | Leatherdale et al. |
| 2007/0258246 A1 | 11/2007 | Leatherdale et al. |
| 2007/0274095 A1 | 11/2007 | Destain |
| 2007/0279931 A1 | 12/2007 | Bryan et al. |
| 2008/0002256 A1 | 1/2008 | Sasagawa et al. |
| 2008/0049419 A1 | 2/2008 | Ma et al. |
| 2008/0198298 A1 | 8/2008 | Jeong et al. |
| 2010/0156953 A1 | 6/2010 | Nevitt et al. |
| 2010/0165621 A1 | 7/2010 | Hoffend, Jr. et al. |
| 2010/0165660 A1* | 7/2010 | Weber et al. ............ 362/609 |
| 2010/0238686 A1* | 9/2010 | Weber et al. ............ 362/609 |
| 2011/0051047 A1* | 3/2011 | O'Neill et al. ............ 349/67 |
| 2011/0096529 A1* | 4/2011 | Wheatley et al. ......... 362/97.1 |

FOREIGN PATENT DOCUMENTS

| | | |
|---|---|---|
| EP | 1 942 302 | 7/2008 |
| JP | 08-297282 | 11/1996 |
| JP | 11-039916 | 2/1999 |
| WO | 01/71248 | 9/2001 |
| WO | 2006/118028 | 9/2006 |

* cited by examiner

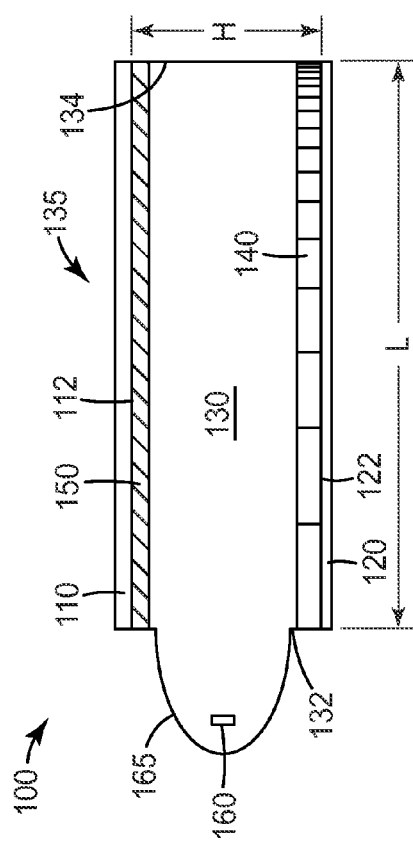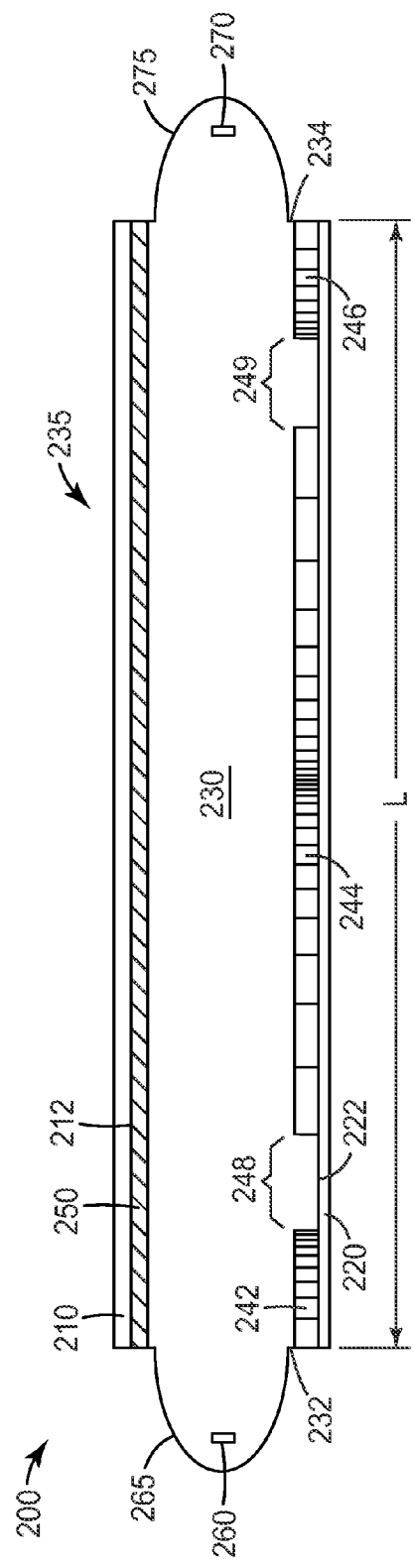

SEMISPECULAR HOLLOW BACKLIGHT WITH GRADIENT EXTRACTION

CROSS REFERENCE TO RELATED APPLICATIONS

This is a continuation of application Ser. No. 13/124,951, filed Oct. 12, 2009; which was a national stage filing under 35 U.S.C. 371 of PCT/US2009/060308 filed Oct. 12, 2009, which International Application was published by the International Bureau in English on Jun. 3, 2010, which claims priority to U.S. 61/108,606, filed Oct. 27, 2008, the disclosure of which is incorporated by reference in their entirety herein.

BACKGROUND

Backlights can be considered to fall into one of two categories depending on where the light sources are positioned relative to the output area of the backlight, where the backlight "output area" corresponds to the viewable area or region of the display device. The "output area" of a backlight is sometimes referred to herein as an "output region" or "output surface" to distinguish between the region or surface itself and the area (the numerical quantity having units of square meters, square millimeters, square inches, or the like) of that region or surface.

The first category is "edge-lit." In an edge-lit backlight, one or more light sources are disposed—from a plan-view perspective—along an outer border or periphery of the backlight construction, generally outside the area or zone corresponding to the output area. Often, the light source(s) are shielded from view by a frame or bezel that borders the output area of the backlight. The light source(s) typically emit light into a component referred to as a "light guide," particularly in cases where a very thin profile backlight is desired, as in laptop computer displays. The light guide is a clear, solid, and relatively thin plate whose length and width dimensions are on the order of the backlight output area. The light guide uses total internal reflection (TIR) to transport or guide light from the edge-mounted lamps across the entire length or width of the light guide to the opposite edge of the backlight, and a non-uniform pattern of localized extraction structures is provided on a surface of the light guide to redirect some of this guided light out of the light guide toward the output area of the backlight. Such backlights typically also include light management films, such as a reflective material disposed behind or below the light guide, and a reflective polarizing film and prismatic BEF film(s) disposed in front of or above the light guide, to increase on-axis brightness.

In the view of Applicants, drawbacks or limitations of existing edge-lit backlights include the following: the relatively large mass or weight associated with the light guide, particularly for larger backlight sizes; the need to use components that are non-interchangeable from one backlight to another, since light guides must be injection molded or otherwise fabricated for a specific backlight size and for a specific source configuration; the need to use components that require substantial spatial non-uniformities from one position in the backlight to another, as with existing extraction structure patterns; and, as backlight sizes increase, increased difficulty in providing adequate illumination due to limited space or "real estate" along the edge of the display, since the ratio of the perimeter to the area of a rectangle decreases linearly (1/L) with the characteristic in-plane dimension L (e.g., length, or width, or diagonal measure of the output region of the backlight, for a given aspect ratio rectangle).

The second category of backlight is "direct-lit." In a direct-lit backlight, one or more light sources are disposed—from a plan-view perspective—substantially within the area or zone corresponding to the output area, normally in a regular array or pattern within the zone. Alternatively, one can say that the light source(s) in a direct-lit backlight are disposed directly behind the output area of the backlight. A strongly diffusing plate is typically mounted above the light sources to spread light over the output area. Again, light management films, such as a reflective polarizer film, and prismatic BEF film(s), can also be placed above the diffuser plate for improved on-axis brightness and efficiency.

In the view of Applicants, drawbacks or limitations of existing direct-lit backlights include the following: inefficiencies associated with the strongly diffusing plate; in the case of LED sources, the need for large numbers of such sources for adequate uniformity and brightness, with associated high component cost and heat generation; and limitations on achievable thinness of the backlight beyond which light sources produce non-uniform and undesirable "punchthrough," wherein a bright spot appears in the output area above each source.

In some cases, a direct-lit backlight may also include one or some light sources at the periphery of the backlight, or an edge-lit backlight may include one or some light sources directly behind the output area. In such cases, the backlight is considered "direct-lit" if most of the light originates from directly behind the output area of the backlight, and "edge-lit" if most of the light originates from the periphery of the output area of the backlight.

Backlights of one type or another are usually used with liquid crystal (LC)-based displays. Liquid crystal display (LCD) panels, because of their method of operation, utilize only one polarization state of light, and hence for LCD applications it may be important to know the backlight's brightness and uniformity for light of the correct or useable polarization state, rather than simply the brightness and uniformity of light that may be unpolarized. In that regard, with all other factors being equal, a backlight that emits light predominantly or exclusively in the useable polarization state is more efficient in an LCD application than a backlight that emits unpolarized light. Nevertheless, backlights that emit light that is not exclusively in the useable polarization state, even to the extent of emitting randomly polarized light, are still fully useable in LCD applications, since the non-useable polarization state can be eliminated by an absorbing polarizer provided between the LCD panel and the backlight.

SUMMARY

In one aspect, the present disclosure provides a backlight that includes a partially transmissive front reflector and a back reflector that form a hollow light recycling cavity having an output surface. The backlight also includes a semi-specular element and a light extraction element disposed within the hollow light recycling cavity. The light extraction element has a gradient specularity. The backlight further includes at least one light source disposed to inject light into the hollow light recycling cavity. The at least one light source is configured to inject light over a limited angular range.

In another aspect, the present disclosure provides a display system that includes a display panel, and a backlight disposed to provide light to the display panel. The backlight includes a partially transmissive front reflector and a back reflector that form a hollow light recycling cavity having an output surface. The backlight also includes a semi-specular element and a light extraction element disposed within the hollow light recycling cavity. The light extraction element has a gradient specularity. The backlight further includes at least one light source disposed to inject light into the hollow light recycling cavity. The at least one light source is configured to inject light over a limited angular range.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification reference is made to the appended drawings, where like reference numerals designate like elements, and wherein:

FIG. 1 is a schematic cross-section view of one embodiment of an edge-lit hollow backlight.

FIG. 2 is a schematic cross-section view of another embodiment of an edge-lit hollow backlight.

The figures are not necessarily to scale. Like numbers used in the figures refer to like or similar components. However, it will be understood that the use of a number to refer to a component in a given figure is not intended to limit the component in another figure labeled with the same number.

DETAILED DESCRIPTION

Figure 3:
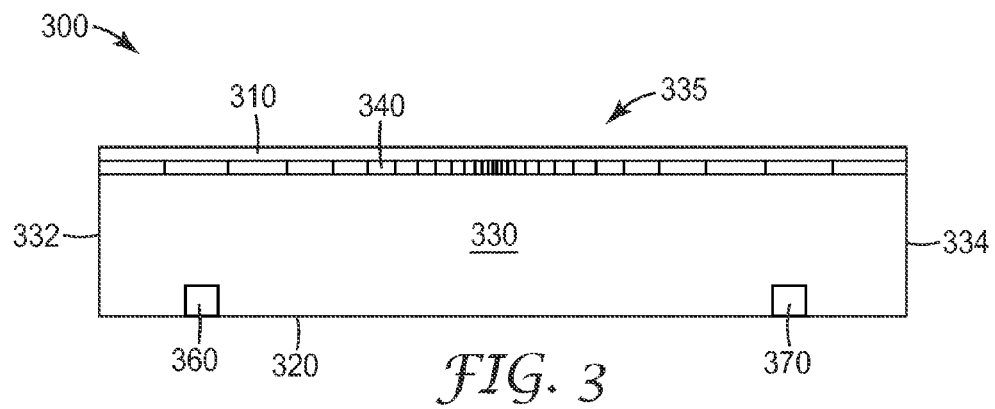
FIG. 3 is a schematic cross-section view of one embodiment of a direct-lit hollow backlight.

In general, the present disclosure describes several embodiments of thin, hollow backlights that can be configured to provide selected output light flux distributions. For example, in some embodiments, the backlights of the present disclosure can be configured to provide a uniform light flux distribution at output surfaces of the backlights. The term "uniform" refers to light flux distributions that have no observable brightness features or discontinuities that would be objectionable to a viewer. The acceptable uniformity of an output light flux distribution will often depend on the application, e.g., a uniform output light flux distribution in a general lighting application may not be considered uniform in a display application.

Further, for example, at least one or more of the embodiments of backlights of the present disclosure can be configured to provide an output light flux distribution that has an increased flux near a center region of the output surface compared to the flux near an edge region of the backlight. In some embodiments, a ratio of the luminance proximate a center region of the output surface to the luminance proximate an edge region of the output surface is at least about 1.10. While such an output light flux distribution may be considered non-uniform, for some applications, this type of distribution may be desired. Any suitable output light flux distribution can be provided.

In at least one of these embodiments, the backlight includes a partially transmissive front reflector and a back reflector that form a hollow light recycling cavity having an output surface. The backlight further includes a light extraction element disposed in the light recycling cavity, and the light extraction element has a gradient specularity. This exemplary backlight can also include at least one semi-specular element disposed within the cavity, and one or more light sources disposed to emit light into the cavity over a limited angular range.

As used herein, the term "output light flux distribution" refers to the variation in brightness over the output surface of the backlight. The term "brightness" refers to the light output per unit area into a unit solid angle ($cd/m^2$).

While not wishing to be bound by any particular theory, the output light flux distribution of the backlights described herein can be tailored by controlling one or more of the following parameters:
1. The positioning of the front reflector relative to the back reflector;
2. The shape of one or both of the front and back reflectors;
3. The reflective and transmissive properties of the front and back reflectors;
4. The reflective, transmissive, and diffusive properties of the light extraction element;
5. The reflective properties of the at least one semi-specular element; and
6. The average flux deviation angle of light emitted into the cavity by the one or more light sources.

Controlling these factors involves balancing between filling the light recycling cavity with light and turning or redirecting light within the cavity such that at least a portion transmits through the front reflector at desired locations of the output surface.

In general, light propagating within the cavity can be thought of as falling into two angular distributions or zones: the transport zone and the transmission zone. The transport zone includes light propagating in directions within the cavity such that the light is not likely to be transmitted through the front reflector. The angular range of light in the transport zone will at least in part depend on the reflection and transmission properties of the front and back reflectors; the reflection, transmission, and diffusion properties of the light extraction element; the reflection properties of the semi-specular element within the cavity; and the geometry of the cavity. For example, in some embodiments of backlights described herein, various front reflectors are included that exhibit an increasing reflectivity for light that is incident, e.g., within an angle with the front reflector's major surface of 30 degrees or less. For these front reflectors, the transport zone can be defined as including light that is propagating within the cavity in a direction that is within 30 degrees of the surface of the front reflector. In other embodiments, the front reflector may not exhibit this increased reflectivity for off-angle light. In these embodiments, the transport zone may be defined as including light propagating within the cavity in a direction that is substantially parallel to a major surface of the front reflector.

The transmission zone includes light propagating within the cavity in directions that allow at least a portion of such light to transmit through the front reflector. In other words, the transmission zone includes propagating light that is not in the transport zone.

For a backlight having a front reflector and back reflector that are substantially parallel, a light flux distribution at an output surface of the backlight can at least in part be determined by the rate of conversion of light from the transport zone to the transmission zone. This rate depends on several factors, e.g., the reflectance and specularity of the front, back, and edge reflectors of the backlight, the number of illuminated edges of the backlight, the light injection angle of the one or more light sources, and the ratio of the length L of the backlight to the thickness H. By adjusting H, the rate of conversion of light from the transport zone to the transmission zone can at least in part be controlled.

The thickness H can be adjusted by positioning the front and back reflectors such that at least a portion of the back reflector is non-parallel to the front reflector. For example, as is further described herein, the back reflector can be positioned to form a wedge-shaped hollow light recycling cavity with the front reflector. This wedge shape provides an H that varies in at least one direction in the hollow light recycling cavity.

The thickness H of the light recycling cavity can also be adjusted by shaping one or both of the front and back reflectors to be non-planar. As used herein, the term "non-planar" refers to a reflector, either front or back, that cannot be substantially contained within a plane. A reflector having sub-millimeter structures formed on a substantially planar substrate would not be considered non-planar for purposes of this application. In some embodiments, a backlight can include a non-planar back reflector that includes one or more portions that slope towards the front reflector. These sloping portions can be positioned to provide an increased conversion rate of light from the transport zone to the transmission zone at desired locations within the cavity. Backlights having non-planar back reflectors are further described in, for example, U.S. Patent Application No. 61/030,767 entitled BACKLIGHTS HAVING SELECTED OUTPUT LIGHT FLUX DISTRIBUTIONS AND DISPLAY SYSTEMS USING SAME.

The light flux distribution produced by one or more of the backlights described herein can also be controlled in part by selecting the reflective and/or transmissive properties of one or both of the front and back reflectors. For example, in the case of a backlight designed to emit only light in a particular (useable) polarization state, the front reflector can have a high reflectivity for such useable light to support lateral transport or spreading, and for light ray angle randomization to achieve acceptable spatial uniformity of the backlight output, but a high enough transmission into the appropriate application-useable angles to ensure that application brightness of the backlight is acceptable. Further, in some embodiments, the front reflector of the recycling cavity has a reflectivity that generally increases with angle of incidence, and a transmission that generally decreases with angle of incidence, where the reflectivity and transmission are for unpolarized visible light and for any plane of incidence, and/or for light of a useable polarization state incident in a plane for which oblique light of the useable polarization state is p-polarized (and further, the front reflector has a high value of hemispheric reflectivity while also having a sufficiently high transmission of application-useable light).

The light flux distribution produced by one or more of the backlights described herein can also be controlled in part by selecting the reflective, transmissive, and diffusive properties of the light extraction element. The light extraction element has a gradient specularity, i.e. the path the light ray takes after interaction with the light extraction element depends where the light ray intersects the light extraction element. The light extraction element can include light extraction patterns that are positioned precisely to extract light by refraction, reflection, diffusion or similar processes. In one embodiment, the light extraction elements can include particulates such as refractive or diffusive beads, diffusing particles, down-converting materials such as phosphors, microstructures, textures and the like. Examples of light extraction elements can be found, for example, in U.S. Pat. No. 6,845,212 (Gardiner et al.) and U.S. Pat. No. 7,223,005 (Lamb et al.); and also in U.S. patent application Ser. No. 11/421,241. Examples of phosphors include those suitable for LED converting materials, described elsewhere. The extraction features can be grooves, lenslets, or other microstructured or printed features designed to extract light from the backlight. The extraction features can be imparted to the lightguide using several methods, including but not limited to: casting, embossing, microreplicating, printing, ablating, etching and other methods known in the art.

An exemplary embodiment of backlight also includes at least one semi-specular element, the reflective properties of which can also be selected to in part determine the output light flux distribution. For example, the semi-specular element or elements can provide the hollow light recycling cavity with a balance of specular and diffuse characteristics, the elements having sufficient specularity to support significant lateral light transport or mixing within the cavity, but also having sufficient diffusivity to substantially homogenize the angular distribution of steady state light within the cavity, even when injecting light into the cavity only over a narrow range of angles (and further, in the case of a backlight designed to emit only light in a particular (useable) polarization state, recycling within the cavity preferably includes a degree of randomization of reflected light polarization relative to the incident light polarization state, which allows a mechanism by which non-useable polarized light is converted into useable polarized light). In some embodiments, the light extraction element and the semi-specular element can be combined into one optical element disposed in the cavity; however, they can also be separate elements disposed in the cavity.

Finally, the average flux deviation angle of light emitted into the cavity by the one or more light sources can be controlled to help provide the desired collimation of light injected into the cavity. For example, the backlights described herein can include light injection optics that partially collimate or confine light initially injected into the recycling cavity to propagation directions close to a transverse plane (the transverse plane being parallel to the output area or surface of the backlight), e.g., an injection beam having an average flux deviation angle from the transverse plane in a range from 0 to 40 degrees, or 0 to 30 degrees, or 0 to 15 degrees. In addition to the flux deviation angle, the shape of the light emitted into the cavity by the light sources can also be controlled. For example, the emitted light can be radially symmetrical about an emission axis.

Backlights for LCD panels, in their simplest form, consist of light generation surfaces such as the active emitting surfaces of LED dies or the outer layers of phosphor in a CCFL bulb, and a geometric and optical arrangement of distributing or spreading this light in such a way as to produce an extended- or large-area illumination surface or region, referred to as the backlight output surface. Generally, this process of transforming very high brightness local sources of light into a large-area output surface results in a loss of light because of interactions with all of the backlight cavity surfaces, and interactions with the light-generation surfaces. To a first approximation, any light that is not delivered by this process through the output area or surface associated with a front reflector—optionally into a desired application viewer-cone (if any), and with a particular (e.g., LCD-useable) polarization state (if any)—is "lost" light. In a commonly assigned related application, we describe a methodology of uniquely characterizing any backlight containing a recycling cavity by two essential parameters. See U.S. Patent Application No. 60/939,084, entitled THIN HOLLOW BACKLIGHTS WITH BENEFICIAL DESIGN CHARACTERISTICS.

A backlight cavity, or more generally any lighting cavity, that converts line or point sources of light into uniform extended area sources of light can be made using a combination of reflective and transmissive optical components. In many cases, the desired cavity is very thin compared to its lateral dimension.

Historically, solid light guides have generally been used for the thinnest backlights and, except for very small displays such as those used in handheld devices, have been illuminated with linearly continuous light sources such as cold cathode fluorescent lights (CCFLs). A solid light guide provides low loss transport of light and specular reflections at the top and bottom surfaces of the light guide via the phenomenon of total internal reflection (TIR) of light. The specular reflection of light provides the most efficient lateral transport of light within a light guide. Extractors placed on the top or bottom surface of a solid light guide redirect the light to direct it out of the light guide, creating in essence a partial reflector.

Solid light guides, however, present several problems for large displays such as cost, weight, and light uniformity. The problem with uniformity for large area displays has increased with the advent of separate red/green/blue (RGB) colored LEDs, which are effectively point sources of light compared to the much larger area of the output region of the backlight. The high intensity point sources can cause uniformity problems with conventional direct-lit backlights as well as edge-lit systems that utilize solid light guides. The uniformity problems can be greatly reduced if a hollow light guide could be made that also provides for significant lateral transport of light as in a solid light guide. In some cases for polarization and light ray angle recycling systems, a hollow cavity can be more proficient at spreading light laterally across a display face than a solid cavity. Some of the components that can be used to accomplish this effectively for a hollow light guide have not generally been available to the backlight industry, or in cases where the components already existed, the hollow light guides have not until now been constructed in the correct fashion to make a uniform, thin, efficient hollow light mixing cavity.

An efficient hollow reflective cavity has several advantages over a solid light guide for making a thin uniform backlight, even though a solid light guide does provide efficient top and bottom reflectors via the phenomenon of Total Internal Reflection (TIR). The solid light guide is used primarily to provide a lateral dispersion of the light before the light interacts with other components such as reflective polarizers and other brightness enhancement films.

However, the TIR surfaces of a solid guide are inadequate to meet all the needs of modern backlights, and additional light control films are typically added both above and below the solid light guide. Most systems that use a solid light guide today also use a separate back reflector to utilize brightness enhancement films such as BEF and DBEF (both available from 3M Company, St. Paul, Minn.). These films recycle light that is extracted from the light guide but is unusable for the display because of unsuitable polarization or angle of propagation. The back reflector is typically a white reflector, which is substantially Lambertian in its reflection characteristics. However, much of the lateral transport is first achieved with the TIR surfaces of the solid guide, and the recycled light is converted and returned to the display with the Lambertian back reflector. If separate top and bottom light management films are required anyway, it can be more efficient to use them alone to create a hollow light guide and also to simultaneously provide the functions of a reflective polarizer and other brightness enhancement films. In this manner, the solid guide, as well as other brightness enhancement films, can be omitted.

We propose replacing the solid light guide with air, and the TIR surfaces of a solid light guide with high efficiency low-loss reflectors. These types of reflectors can be important for facilitating optimal lateral transport of the light within the backlight cavity. Lateral transport of light can be initiated by the optical configuration of the light source, or it can be induced by an extensive recycling of light rays in a cavity that utilizes low loss reflectors.

We can replace the TIR surfaces of the solid light guide with spatially separated low loss reflectors that fall into two general categories. One is a partially transmissive or partial reflector for the front face and the second is a full reflector for the back and side faces. As described above, the latter are often added to solid light guide systems anyway. For optimal transport of light and mixing of light in the cavity, both the front and back reflectors may be specular or semi-specular instead of Lambertian. A semi-specular component of some type is useful somewhere within the cavity to promote uniform mixing of the light. The use of air as the main medium for lateral transport of light in large light guides enables the design of lighter, lower cost, and more uniform display backlights.

For a hollow light guide to significantly promote the lateral spreading of light, the means of light injection into the cavity is important, just as it is in solid light guides. The format of a hollow light guide allows for more options for injecting light at various points in a direct lit backlight, especially in backlights with multiple but optically isolated zones. In a hollow light guide system, the function of the TIR and Lambertian reflectors can be accomplished with the combination of a specular reflector and a semi-specular, forward scattering diffusion element.

Exemplary partial reflectors (front reflectors) we describe here—for example, the asymmetric reflective films (ARFs) described in co-owned U.S. Application No. 60/939,079—provide for low loss reflections and also for better control of transmission and reflection of polarized light than is possible with TIR in a solid light guide alone. Thus, in addition to improved light distribution in a lateral sense across the face of the display, the hollow light guide can also provide for improved polarization control for large systems. Significant control of transmission with angle of incidence is also possible with the ARFs mentioned above. In this manner, light from the mixing cavity can be collimated to a significant degree as well as providing for a polarized light output with a single film construction.

In some embodiments, preferred front reflectors have a relatively high overall reflectivity, to support relatively high recycling within the cavity. We characterize this in terms of "hemispheric reflectivity," meaning the total reflectivity of a component (whether a surface, film, or collection of films) when light is incident on it from all possible directions. Thus, the component is illuminated with light incident from all directions (and all polarization states, unless otherwise specified) within a hemisphere centered about a normal direction, and all light reflected into that same hemisphere is collected. The ratio of the total flux of the reflected light to the total flux of the incident light yields the hemispheric reflectivity, $R_{hemi}$. Characterizing a reflector in terms of its $R_{hemi}$ is especially convenient for recycling cavities because light is generally incident on the internal surfaces of the cavity—whether the front reflector, back reflector, or side reflectors—at all angles. Further, unlike the reflectivity for normal incidence, $R_{hemi}$ is insensitive to, and already takes into account, the variability of reflectivity with incidence angle, which may be very significant for some components (e.g., prismatic films).

Further, in some embodiments, preferred front reflectors exhibit a (direction-specific) reflectivity that increases with incidence angle away from the normal (and a transmission that generally decreases with angle of incidence), at least for light incident in one plane. Such reflective properties cause the light to be preferentially transmitted out of the front reflector at angles closer to the normal, i.e., closer to the viewing axis of the backlight. This helps to increase the perceived brightness of the display at viewing angles that are important in the display industry (at the expense of lower perceived brightness at higher viewing angles, which are usually less important). We say that the increasing reflectivity with angle behavior is "at least for light incident in one plane," because sometimes a narrow viewing angle is desired for only one viewing plane, and a wider viewing angle is desired in the orthogonal plane. An example is some LCD TV applications, where a wide viewing angle is desired for viewing in the horizontal plane, but a narrower viewing angle is specified for the vertical plane. In other cases narrow angle viewing is desirable in both orthogonal planes so as to maximize on-axis brightness.

With this in mind, let us consider the meaning of specifying (if we desire) that the front reflector "exhibit a reflectivity that generally increases with angle of incidence," in the case where the front reflector is an ARF such as is described in U.S. Patent Application No. 60/939,079. The ARF includes a multilayer construction (e.g., coextruded polymer microlayers that have been oriented under suitable conditions to produce desired refractive index relationships, and desired reflectivity characteristics) having a very high reflectivity for normally incident light in the block polarization state and a lower but still substantial reflectivity (e.g., 25 to 90%) for normally incident light in the pass polarization state. The very high reflectivity of block-state light generally remains very high for all incidence angles. The more interesting behavior is for the pass-state light, since that exhibits an intermediate reflectivity at normal incidence. Oblique pass-state light in the plane of incidence will exhibit an increasing reflectivity with increasing incidence angle, due to the nature of s-polarized light reflectivity (the relative amount of increase, however, will depend on the initial value of pass-state reflectivity at normal incidence). Thus, light emitted from the ARF in a viewing plane will be partially collimated or confined in angle. Oblique pass-state light in the other plane of incidence, however, can exhibit any of three behaviors depending on the magnitude and polarity of the z-axis refractive index difference between microlayers relative to the in-plane refractive index differences, as discussed in the 60/939,079 application.

In one case, a Brewster angle exists, and the reflectivity of this light decreases with increasing incidence angle. This produces bright off-axis lobes in a viewing plane parallel to the output surface, which are usually undesirable in LCD viewing applications (although in other applications this behavior may be acceptable, and even in the case of LCD viewing applications this lobed output may be re-directed towards the viewing axis with the use of a prismatic turning film).

In another case, a Brewster angle does not exist or is very large, and the reflectivity of the p-polarized light is relatively constant with increasing incidence angle. This produces a relatively wide viewing angle in the referenced viewing plane.

In the third case, no Brewster angle exists, and the reflectivity of the p-polarized light increases significantly with incidence angle. This can produce a relatively narrow viewing angle in the referenced viewing plane, where the degree of collimation is tailored at least in part by controlling the magnitude of the z-axis refractive index difference between microlayers in the ARF.

Of course, the reflective surface need not have asymmetric on-axis polarizing properties as with ARF. Symmetric multilayer reflectors, for example, can be designed to have a high reflectivity but with substantial transmission by appropriate choice of the number of microlayers, layer thickness profile, refractive indices, and so forth. In such a case the s-polarized components will increase with incidence angle, in the same manner with each other. Again, this is due to the nature of s-polarized light reflectivity, but the relative amount of increase will depend on the initial value of the normal incidence reflectivity. The p-polarized components will have the same angular behavior as each other, but this behavior can be controlled to be any of the three cases mentioned above by controlling the magnitude and polarity of the z-axis refractive index difference between microlayers relative to the in-plane refractive index differences.

Thus, we see that the increase in reflectivity with incidence angle (if present) in the front reflector can refer to light of a useable polarization state incident in a plane for which oblique light of the useable polarization state is p-polarized. Alternately, such increase in reflectivity can refer to the average reflectivity of unpolarized light, in any plane of incidence.

In some embodiments, the back reflectors also have a high hemispherical reflectivity for visible light, typically, much higher than the front reflector since the front reflector is deliberately designed to be partially transmissive in order to provide the required light output of the backlight. The hemispherical reflectivity of the back reflector is referred to as $R^b_{hemi}$, while that of the front reflector is referred to as $R^f_{hemi}$. Preferably, the product $R^f_{hemi}*R^b_{hemi}$ is at least 45%.

FIG. 1 is a schematic cross-section view of one embodiment of a backlight 100. The backlight 100 includes a partially transmissive front reflector 110 and a back reflector 120 that form a hollow light recycling cavity 130. The cavity 130 includes an output surface 135. As is further described herein, cavity 130 further includes a light extraction element 140 having a gradient specularity. The backlight 100 also includes a semi-specular element 150 disposed within the hollow light recycling cavity 130, as is further described herein. In FIG. 1, light extraction element 140 is shown disposed adjacent a major surface 122 of back reflector 120, and semi-specular element 150 is shown disposed adjacent a major surface 112 of partially transmissive front reflector 110. It is to be understood that both light extraction element 140 and semi-specular element 150 can be disposed anywhere within cavity 130, for example both elements can be disposed adjacent front reflector 110, adjacent back reflector 120, or at a position partway between the two reflectors. In some cases, light extraction element 140 and semi-specular element 150 can be combined into a common optical element (not shown).

As shown in FIG. 1, the backlight 100 also includes one or more light sources 160 disposed to emit light into the light recycling cavity 130. The one or more light sources 160 are configured to emit light into the light recycling cavity 130 over a limited angular range. In the embodiment illustrated in FIG. 1, the light sources 160 are disposed proximate edge 132 of the cavity 130.

The backlight 100 can be any suitable size and shape. In some embodiments, the backlight 100 can have a length L and a width W of one or more millimeters to several meters. Further, in some embodiments, two or more backlights can be tiled together and controlled individually to provide large zoned backlights.

As illustrated, backlight 100 includes an injector or reflector 165 that helps to direct light from the one or more light sources 160 into the light recycling cavity 130. Any suitable injector or reflector can be used with the backlight 100, e.g., wedges, parabolic reflectors, lenses, etc. See, e.g., the injectors described in U.S. Patent Application No. 60/939,082, entitled COLLIMATING LIGHT INJECTORS FOR EDGE-LIT BACKLIGHTS.

Although depicted as having one or more light sources 160 positioned along one side or edge of the backlight 100, light sources can be positioned along two, three, four, or more sides of the backlight 100. For example, for a rectangularly shaped backlight, one or more light sources can be positioned along each of the four sides of the backlight.

The front reflector 110 can include any partially transmissive reflector or reflectors, e.g., the partially transmissive reflectors described in co-owned U.S. Patent Application No. 60/939,079, entitled BACKLIGHT AND DISPLAY SYSTEM USING SAME; and U.S. Patent Application No. 60/939,084, entitled THIN HOLLOW BACKLIGHTS WITH BENEFICIAL DESIGN CHARACTERISTICS. In some embodiments, the front reflector 110 can include one or more polymeric multilayer reflective polarizing films as described, e.g., in U.S. Pat. No. 5,882,774 (Jonza et al.) entitled OPTICAL FILM; U.S. Pat. No. 6,905,220 (Wortman et al.) entitled BACKLIGHT SYSTEM WITH MULTI-LAYER OPTICAL FILM REFLECTOR; U.S. Pat. No. 6,210,785 (Weber et al.) entitled HIGHT EFFICIENCY OPTICAL DEVICES; U.S. Pat. No. 6,783,349 (Neavin et al.) entitled APPARATUS FOR MAKING MULTILAYER OPTICAL FILMS; U.S. Patent Publication No. 2008/0002256 (Sasagawa et al.), entitled OPTICAL ARTICLE INCLUDING A BEADED LAYER; U.S. Pat. No. 6,673,425 (Hebrink et al.) entitled METHOD AND MATERIALS FOR PREVENTING WARPING IN OPTICAL FILMS; U.S. Patent Publication No. 2004/0219338 (Hebrink et al.) entitled MATERIALS, CONFIGURATIONS, AND METHODS FOR REDUCING WARPAGE IN OPTICAL FILMS; and U.S. patent application Ser. No. 11/735,684 (Hebrink et al.) entitled OPTICAL ARTICLE AND METHOD OF MAKING.

In some embodiments, the partially transmissive front reflector 110 can provide polarized light at the output surface. Suitable polarizing front reflectors include, e.g., DBEF, APF, DRPF (all available from 3M Company, St. Paul, Minn.), ARF, TOP, (both as described in the 60/939,079 application), etc. In other embodiments, the partially transmissive front reflector can provide non-polarized light. Suitable non-polarizing front reflectors include, e.g., perforated mirrors, microstructured films, etc. Further examples of non-polarizing films are described, e.g., in U.S. Patent Application No. 60/939,084.

The front reflector 110 is partially transmissive and partially reflective for at least visible light. The partial transmissivity of the front reflector 110 allows at least a portion of light within the cavity 130 to be emitted through the output surface 135 of the cavity 130. The front reflector 110 can include any suitable film(s) and/or layer(s) that provide partial transmission and reflection to light incident upon the front reflector 110 from inside the cavity 130.

In some embodiments, the front reflector 110 is operable to transmit polarized light. In such embodiments, the front reflector 110 includes an on-axis average reflectivity of at least about 90% for visible light polarized in a first plane, and an on-axis average reflectivity of at least about 5% but less than about 90% for visible light polarized in a second plane parallel to the first plane. As used herein, the term "on-axis average reflectivity" refers to the average reflectivity of light incident on a reflector in a direction that is substantially normal to such surface. Further, the term "total hemispherical reflectivity" refers to the total reflectivity of a reflector for light incident on the reflector from all directions within a hemisphere centered around a normal to the reflector. Those skilled in the art would consider light polarized in the second plane to be in a useable polarization state, i.e., such polarized light would pass through the lower absorbing polarizer of an LC panel (e.g., lower absorbing polarizer 658 of FIG. 6) and be incident on the LC panel. Further, those skilled in the art would consider the first plane to be parallel with the block axis and the second plane to be parallel to the pass axis of the polarizing front reflector 110.

Further, in some embodiments, it may be desirable that the average on-axis transmission of the useable polarization state is several times greater than the transmission of non-useable polarization state to ensure that the output from the cavity 130 is substantially the desired polarization state. This also helps to reduce the total loss of useable light from the cavity. In some embodiments, the on-axis transmissivity of useable light to non-useable light is at least 10. In other embodiments, the ratio of transmission of useable light to non-useable light is at least 20.

Figure 4A:
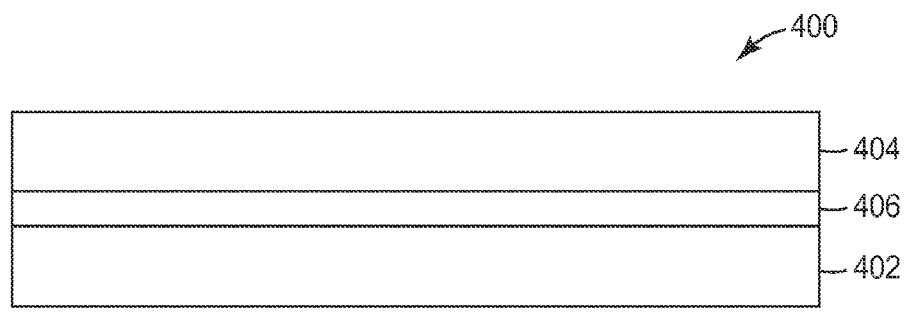
FIGS. 4A-4C are schematic cross-section views of various embodiments of front reflectors.

In some embodiments, the front reflector 110 can include two or more films. For example, FIG. 4A is a schematic cross-section view of a portion of a front reflector 400. Reflector 400 includes a first film 402 positioned proximate a second film 404. The films 402, 404 can be spaced apart or in contact with each other. Alternatively, the films 402, 404 can be attached using any suitable technique. For example, the films 402, 404 can be laminated together using optional adhesive layer 406. Any suitable adhesive can be used for layer 406, e.g., pressure sensitive adhesives (such as 3M Optically Clear Adhesives), and UV-curable adhesives (such as UVX-4856). In some embodiments, an adhesive layer 406 can be replaced with an index matching fluid, and the films 402, 404 can be held in contact using any suitable technique known in the art.

Films 402, 404 can include any suitable films described herein in regard to the front reflector. Films 402, 404 can have similar optical characteristics; alternatively, films 402, 404 can be different constructions that provide different optical characteristics. In one exemplary embodiment, film 402 can include an asymmetric reflective film as described herein having a pass axis in one plane, and film 404 can include a second asymmetric reflective film having a pass axis in a second plane that is non-parallel to the pass axis of the first film 402. This non-parallel relationship can form any suitable angle between the two pass axis planes. In some embodiments, the pass axis planes can be nearly orthogonal. Such a relationship would provide a high degree of reflectivity in the pass axis for the front reflector 400.

Further, for example, film 402 may include an asymmetric reflective film, and film 404 may include a prismatic brightness enhancing film such as BEF. In some embodiments, the BEF may be oriented in relation to the asymmetric reflective film such that the BEF collimates transmitted light in a plane that is orthogonal to the collimating plane of the asymmetric film. Alternatively, in other embodiments, the BEF may be oriented such that the BEF collimates transmitted light in the collimating plane of the asymmetric reflective film.

Although the front reflector 400 is depicted in FIG. 4A as including two films 402, 404, the front reflector 400 can include three or more films. For example, a three layer front reflector can be made using three layers of reflective polarizer (such as DBEF or APF, both available from 3M Company, St.

Paul, Minn.). If the three layers are arranged such that the polarization axis of the second layer is at 45° relative to the polarization axis of the first layer and the polarization axis of the third layer is at 90° relative to the polarization axis of the first layer, the resulting front reflector will reflect approximately 75% of the normal incidence light. Other angles of rotation between the layers could be used to achieve different levels of reflection. A birefringent (polarization rotating) layer or a scattering layer between two reflective polarizers with nearly orthogonal pass axes can also create reflective films that have a controlled degree of reflectivity to be used as the front reflector.

Figure 4B:
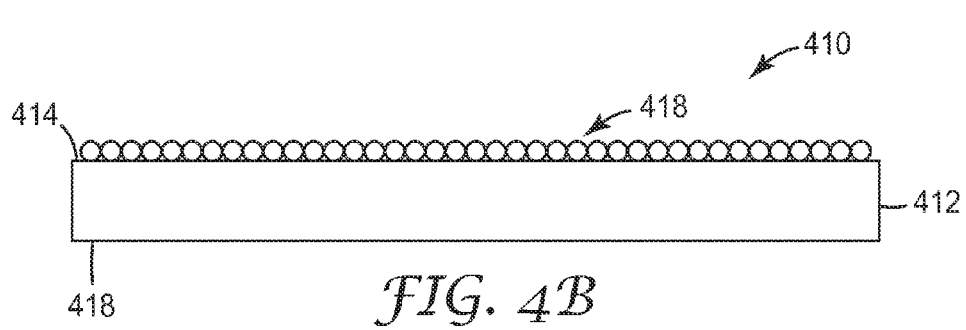

The front reflectors of the present disclosure can also include optical elements positioned in or on one or more surfaces of the reflector. For example, FIG. 4B is a schematic cross-section view of a portion of another embodiment of front reflector 410. The reflector 410 includes a film 412 having a first major surface 414 and a second major surface 416. The film 412 can include any suitable film(s) or layer(s) described herein in regard to a front reflector. A plurality of optical elements 418 are positioned on or in the first major surface 414. Although depicted as positioned only on first major surface 414, optical elements can be positioned on the second major surface 416 or on both first and second major surfaces 414, 416. Any suitable optical elements can be positioned on or in the film 412, e.g., microspheres, prisms, cube-corners, lenses, lenticular elements, etc. The optical elements can be refractive elements, diffractive elements, diffusive elements, etc. In this embodiment, the optical elements 418 can collimate light that is transmitted by film 412. In other embodiments, the optical elements 418 can diffuse light either incident on the film 412 or exiting the film 412, depending upon the positioning of the optical elements 412.

The optical elements 418 can be positioned on a major surface of the film 412 or at least partially embedded in the major surface of the film 412. Further, the film 410 can be manufactured using any suitable technique, e.g., those techniques for manufacturing bead-coated ESR described in U.S. Patent Application Nos. 60/939,079, entitled BACKLIGHT AND DISPLAY SYSTEM USING SAME, and 60/939,085, entitled RECYCLING BACKLIGHTS WITH SEMI-SPECULAR COMPONENTS.

Figure 4C:
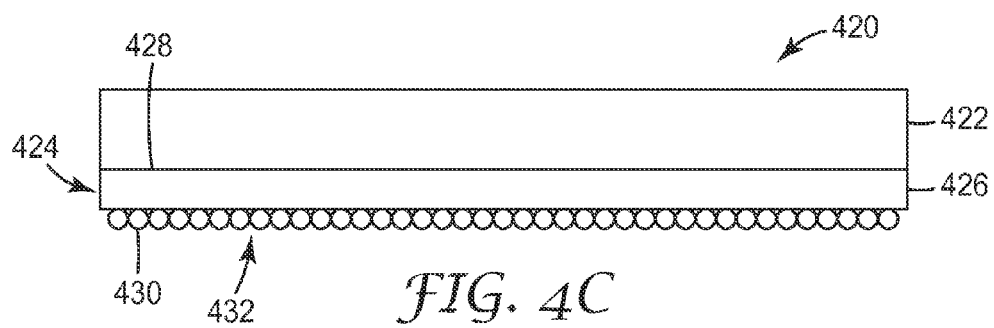

The optical elements 418 can also be positioned on a substrate that is positioned proximate the film 410. For example, FIG. 4C is a schematic cross-section view of a portion of another embodiment of a front reflector 420. The reflector 420 includes a film 422 and a gain diffuser 424 positioned proximate the film 422. The film 422 can include any film(s) and/or layer(s) described herein regarding front reflectors. The gain diffuser 424 includes a substrate 426 having a first major surface 428 and a second major surface 430, and a plurality of optical elements 432 positioned on or in the second major surface 430 of the substrate 426. Any suitable optical elements 432 can be used, e.g., optical elements 418 of FIG. 4B. The substrate 426 can include any suitable optically transmissive substrate.

For the embodiment illustrated in FIG. 4C, the first major surface 428 of the gain diffuser 424 is positioned proximate the polarizing film 422. The diffuser 424 can be positioned proximate film 422 such that it is spaced apart from the film 422, in contact with the film 422, or attached to the film 422. Any suitable technique can be used to attach the diffuser 424 to the film 422, e.g., the use of optical adhesives. Any suitable gain diffuser can be used for diffuser 424. In some embodiments, the optical elements 432 can be positioned on the first major surface 428 of the substrate 426 such that the elements 432 are between the substrate 426 and the polarizing film 422.

Returning to FIG. 1, the front reflector 110 can also be attached to a supporting layer. The support layer can include any suitable material or materials, e.g., polycarbonate, acrylic, PET, etc. In some embodiments, the front reflector 110 can be supported by a fiber reinforced optical film as described, e.g., in U.S. Patent Publication No. 2006/0257678 (Benson et al.), entitled FIBER REINFORCED OPTICAL FILMS; U.S. patent application Ser. No. 11/323,726 (Wright et al.), entitled REINFORCED REFLECTIVE POLARIZER FILMS; and U.S. patent application Ser. No. 11/322,324 (Ouderkirk et al.), entitled REINFORCED REFLECTIVE POLARIZER FILMS.

Further, the front reflector 110 can be attached to the support layer using any suitable technique. In some embodiments, the front reflector 110 can be adhered to the support layer using an optical adhesive. In other embodiments, the front reflector 110 can be attached to an LC panel of a display system (e.g., LC panel 650 of display system 600 of FIG. 6). In such embodiments, the front reflector 110 can be attached to an absorbing polarizer and then attached to an LC panel, or, alternatively, the absorbing polarizer can first be attached to the LC panel and then the front reflector 110 can be attached to the absorbing polarizer. Further, in non-LCD systems, the front reflector 110 can be attached to a tinted front plate.

As mentioned herein, the front reflector 110 can include any suitable film(s) and/or layer(s) that provide a partially reflective and partially transmissive front reflector. In some embodiments, the front reflector 110 can include one or more fiber polarizing films as described, e.g., in U.S. Patent Publication No. 2006/0193577 (Ouderkirk et al.), entitled REFLECTIVE POLARIZERS CONTAINING POLYMER FIBERS; U.S. patent application Ser. No. 11/468,746 (Ouderkirk et al.), entitled MULTILAYER POLARIZING FIBERS AND POLARIZERS USING SAME; and U.S. patent application Ser. No. 11/468,740 (Bluem et al.), entitled POLYMER FIBER POLARIZERS. Other exemplary films that can be used for the front reflector 110 include cholesteric polarizing films, birefringent pile-of-plates films, birefringent polymer blends (e.g., DRPF, available from 3M Company), and wire grid polarizers.

The films used for the front and back reflectors described herein can be manufactured using any suitable technique. See, e.g., U.S. Pat. No. 6,783,349 (Neavin et al.), entitled APPARATUS FOR MAKING MULTILAYER OPTICAL FILMS.

The front reflector 110 and the back reflector 120 can exhibit any suitable value of $R_{hemi}$. In general, the choice of $R_{hemi}$ for a hollow backlight is influenced by the specific design criteria for a given system. Primary design criteria often include display size (length and width), thickness, source lumens required to achieve a brightness target for a given viewing angle, uniformity of brightness and/or color, and system robustness to variations in light sources, backlight optical materials, or cavity dimensions. Additionally, the ability to space light sources far apart is an important system attribute, as it influences the minimum number of sources that are required, and thus the total cost of sources for the system. Lastly, the desired angular emission from the backlight can influence the choice of $R_{hemi}$, since the angular emission characteristics achievable with polymeric multilayer optical films are dependent on this, with a larger range of angular profiles possible with increasing $R_{hemi}$.

One advantage of a lower $R_{hemi}$ is a higher system efficiency. Generally, the less recycling that occurs, the lower the absorptive losses from multiple reflections in the cavity. Any material in the backlight cavity can absorb light, including the front and back reflectors, the side walls, support structure (e.g. posts), and the light sources themselves. Light can escape through physical gaps in the cavity, or low level transmission through the edge reflectors or back reflector. Reducing the number of reflections reduces these losses, improves system efficiency, and reduces the required source lumens.

In some embodiments, the greater the ratio of cavity length to thickness (e.g., L/H), generally the greater the $R_{hemi}$ required to transport the light within the cavity. Thus for larger and/or thinner backlights, greater $R_{hemi}$ values are generally required to achieve uniformity.

The further apart the desired spacing of the sources, generally the greater the $R_{hemi}$ that is desired so as to minimize non-uniformity between sources (the so-called "head-light effect"). Multiple reflections can help to fill in the darker areas between sources and, in the case of RGB systems, reduce spokes of color by mixing the colors, resulting in a white appearance.

By varying the specularity of the light extraction element, we have shown that for a given L/H, the $R_{hemi}$ required to achieve uniformity can be significantly reduced. This has the advantage of increasing system efficiency and reducing the source lumens required. However, reducing $R_{hemi}$ reduces recycling, resulting in greater sensitivity to manufacturing or component variations. System sensitivity to the following variations increases with decreased recycling: dimensional variation including the varied thickness H, optical variations in reflectance or specularity of the front or back reflectors, optical variations in the reflectance or specularity of the light extraction element, discontinuity of side reflectors, visibility of a support structure (e.g., posts), and color and brightness variations of the light sources. In addition to increased sensitivity to the output of the light sources, the system tolerance to in-service drift, differential aging, or failure of the light sources is decreased with a lower $R_{hemi}$.

It is possible to design two systems having two $R_{hemi}$ and the same uniformity (for example, one having a shaped backplane or a gradient light extraction element with a low $R_{hemi}$, and the other a straight backplane with a higher $R_{hemi}$) yet the sensitivity of the lower $R_{hemi}$ system can in some embodiments be greater than the higher $R_{hemi}$ system. Here, manufacturability considerations may outweigh the increase in system efficiency obtained by lowering $R_{hemi}$. The choice of $R_{hemi}$ can depend on the specific design criteria for that system.

In the embodiment illustrated in FIG. 1, the front reflector 110 faces the back reflector 120 to form cavity 130. The back reflector 120 is preferably highly reflective. For example, the back reflector 120 can have an on-axis average reflectivity for visible light emitted by the light sources of at least 90%, 95%, 98%, 99%, or more for visible light of any polarization. Such reflectivity values also can reduce the amount of loss in a highly recycling cavity. Further, such reflectivity values encompass all visible light reflected into a hemisphere, i.e., such values include both specular and diffuse reflections.

The back reflector 120 can be a predominantly specular, diffuse, or combination specular/diffuse reflector, whether spatially uniform or patterned. In some embodiments, the back reflector 120 can be a semi-specular reflector as is further described herein. See also U.S. Patent Application No. 60/939,085, entitled RECYCLING BACKLIGHTS WITH SEMI-SPECULAR COMPONENTS; and U.S. patent application Ser. No. 11/467,326 (Ma et al.), entitled BACKLIGHT SUITABLE FOR DISPLAY DEVICES. In some cases, the back reflector 120 can be made from a stiff metal substrate with a high reflectivity coating, or a high reflectivity film laminated to a supporting substrate. Suitable high reflectivity materials include Vikuiti™ Enhanced Specular Reflector (ESR) multilayer polymeric film (available from 3M Company); a film made by laminating a barium sulfate-loaded polyethylene terephthalate film (2 mils thick) to Vikuiti™ ESR film using a 0.4 mil thick isooctylacrylate acrylic acid pressure sensitive adhesive, the resulting laminate film referred to herein as "EDR II" film; E-60 series Lumirror™ polyester film available from Toray Industries, Inc.; porous polytetrafluoroethylene (PTFE) films, such as those available from W. L. Gore & Associates, Inc.; Spectralon™ reflectance material available from Labsphere, Inc.; Miro™ anodized aluminum films (including Miro™ 2 film) available from Alanod Aluminum-Veredlung GmbH & Co.; MCPET high reflectivity foamed sheeting from Furukawa Electric Co., Ltd.; White Refstar™ films and MT films available from Mitsui Chemicals, Inc.; and 2×TIPS (i.e., a porous polypropylene film having a high reflectivity and can be made using thermally induced phase separation as described, e.g., in U.S. Pat. No. 5,976,686 (Kaytor et al.). Two sheets of TIPS can be laminated together using an optical adhesive to form a laminate.).

The back reflector 120 can be substantially flat and smooth, or it may have a structured surface associated with it to enhance light scattering or mixing. Such a structured surface can be imparted (a) on the surface of the back reflector 120, or (b) on a transparent coating applied to the surface. In the former case, a highly reflecting film may be laminated to a substrate in which a structured surface was previously formed, or a highly reflecting film may be laminated to a flat substrate (such as a thin metal sheet, as with Vikuiti™ Durable Enhanced Specular Reflector-Metal (DESR-M) reflector available from 3M Company) followed by forming the structured surface, such as with a stamping operation. In the latter case, a transparent film having a structured surface can be laminated to a flat reflective surface, or a transparent film can be applied to the reflector and then afterwards a structured surface imparted to the top of the transparent film.

For those embodiments that include a direct-lit configuration (e.g., backlight 300 of FIG. 3), the back reflector 120 can be a continuous unitary (and unbroken) layer on which the light source(s) are mounted, or it can be constructed discontinuously in separate pieces, or discontinuously insofar as it includes isolated apertures, through which light sources can protrude, in an otherwise continuous layer. For example, strips of reflective material can be applied to a substrate on which rows of LEDs are mounted, each strip having a width sufficient to extend from one row of LEDs to another and having a length dimension sufficient to span between opposed borders of the backlight's output area.

In the embodiment illustrated in FIG. 1, the back reflector 120 is a planar reflector, although backlight 100 can be a non-planar back reflector such that H varies across the cavity 130, as described in the 61/030,767 application. In some embodiments, the back reflector 120 and partially transmissive front reflector 110 can be curved in the same direction (not shown), so that the distance H remains essentially constant throughout the cavity 130. The space between the front reflector and back reflector can be maintained using any suitable techniques, e.g., a rigid plates, tensioning frames, and various structures in the cavity, including posts, walls, or protrusions extending from the back reflector such as bumps or ridges.

The backlight 100 can also include one or more side reflectors 134 located along at least a portion of the outer boundary of the backlight 100 that are preferably lined or otherwise provided with high reflectivity vertical walls to reduce light loss and improve recycling efficiency. The same reflective material used for the back reflector 120 can be used to form these walls, or a different reflective material can be used. In some embodiments, the side reflectors 134 and back reflector 120 can be formed from a single sheet of material. One or both of the side reflectors and walls can be vertical, or alternatively, the side reflectors can be tilted, curved, or structured. Refractive structures can be used on or adjacent to the side reflectors to achieve a desired reflection profile. Wall material and inclination can be chosen to adjust the output light flux distribution.

The backlight 100 includes a light extraction element 140 that has a gradient specularity, resulting in a gradient extraction of light. The gradient extraction can be accomplished by any element that increases or decreases locally the amount of light extraction. Since the partially transmissive front reflector generally has some degree of angularly selective transmission, an extraction element that deviates additional light into the angular range of higher transmission will increase the brightness in that region. The extraction zone is generally toward normal, but can be designed to be at oblique angles. The material that is used for the extraction element can be specular, semispecular or diffuse, translucent, transflective, refractive, diffractive, down-converting such as a phosphor, or the like. Refractive elements can be prisms, lenslets, lenticulars, and the like. Extraction elements may be applied by printing, casting, coating, embossing, etching, ablating, transfer (e.g., adhesive backed dots), lamination and the like. Extraction elements can also be made by local deviations in a reflective surface such as embossing, peening, corrugating, abrading, etching and the like.

A gradient specularity can also be accomplished by a change in the light re-directing properties of a diffusing coating, either locally or gradually across the surface area. This can be accomplished by, for example, a change in thickness, composition, or surface properties. Perforations can also be used, for example a diffusing film having a gradient of perforations. In addition, a reflective film having one specular character (e.g. ESR) can be perforated and disposed over a reflecting film having a different specular character (e.g. a diffuse white reflector such as MCPET available from Furukawa, Japan), to provide the gradient specularity.

As used herein, the term "gradient specularity" is meant a variation in the light extraction capability (i.e. specularity) over the surface equivalent to the output area. In one embodiment, the gradient specularity can be continuously variable and change smoothly, e.g. in a monotonic fashion across the surface of the light extraction element. In some embodiments, the light extraction element can have a gradient in the length direction, the width direction, or both the length and width direction. In some embodiments, the gradient can include one or more step-changes, such as a circular region on a specular back reflector used to make a bright center. In some embodiments, the gradient can be an array of discrete areas of extraction, such as an area of uniform specularity that are different than the specularity in adjacent areas. In some embodiments, the gradient specularity can be a stepped specularity, a discrete change in specularity, a continuous change in specularity, a discontinuous change in specularity, a sequence of multiple regions of different specularity, or a combination of gradient specularity.

The backlight 100 also includes one or more light sources 160 disposed to emit light into the light recycling cavity 130. In this embodiment, the light sources are positioned proximate edge 132 of backlight 100. The light sources 160 are shown schematically. In most cases, these light sources 160 are compact light emitting diodes (LEDs). In this regard, "LED" refers to a diode that emits light, whether visible, ultraviolet, or infrared. It includes incoherent encased or encapsulated semiconductor devices marketed as "LEDs", whether of the conventional or super radiant variety. If the LED emits non-visible light such as ultraviolet light, and in some cases where it emits visible light, it is packaged to include a phosphor (or it may illuminate a remotely disposed phosphor) to convert short wavelength light to longer wavelength visible light, in some cases yielding a device that emits white light. An "LED die" is an LED in its most basic form, i.e., in the form of an individual component or chip made by semiconductor processing procedures. The component or chip can include electrical contacts suitable for application of power to energize the device. The individual layers and other functional elements of the component or chip are typically formed on the wafer scale, and the finished wafer can then be diced into individual piece parts to yield a multiplicity of LED dies. More discussion of packaged LEDs, including forward-emitting and side-emitting LEDs, is provided herein.

Multicolored light sources, whether or not used to create white light, can take many forms in a backlight, with different effects on color and brightness uniformity of the backlight output area. In one approach, multiple LED dies (e.g., a red, a green, and a blue light emitting die) are all mounted in close proximity to each other on a lead frame or other substrate, and then encased together in a single encapsulant material to form a single package, which may also include a single lens component. Such a source can be controlled to emit any one of the individual colors, or all colors simultaneously. In another approach, individually packaged LEDs, with only one LED die and one emitted color per package, can be clustered together for a given recycling cavity, the cluster containing a combination of packaged LEDs emitting different colors such as blue/yellow or red/green/blue. In still another approach, such individually packaged multicolored LEDs can be positioned in one or more lines, arrays, or other patterns.

If desired, other visible light emitters such as linear cold cathode fluorescent lamps (CCFLs) or hot cathode fluorescent lamps (HCFLs) can be used instead of or in addition to discrete LED sources as illumination sources for the disclosed backlights. In addition, hybrid systems such as, for example, (CCFL/LED), including cool white and warm white, CCFL/HCFL, such as those that emit different spectra, may be used. Other suitable light sources include Xe CCFLs, flat fluorescent lamps, field emission sources, photonic lattice sources, vertical cavity surface emitting lasers, external electrode fluorescent lamps, and organic light emitting diodes. The combinations of light emitters may vary widely, and include LEDs and CCFLs, and pluralities such as, for example, multiple CCFLs, multiple CCFLs of different colors, and LEDs and CCFLs.

For example, in some applications it may be desirable to replace the row of discrete light sources with a different light source such as a long cylindrical CCFL, or with a linear surface emitting light guide emitting light along its length and coupled to a remote active component (such as an LED die or halogen bulb), and to do likewise with other rows of sources. Examples of such linear surface emitting light guides are disclosed in U.S. Pat. No. 5,845,038 (Lundin et al.) and U.S. Pat. No. 6,367,941 (Lea et al.). Fiber-coupled laser diode and other semiconductor emitters are also known, and in those cases the output end of the fiber optic waveguide can be considered to be a light source with respect to its placement in the disclosed recycling cavities or otherwise behind the output area of the backlight. The same is also true of other passive optical components having small emitting areas such as lenses, deflectors, narrow light guides, and the like that give off light received from an active component such as a bulb or LED die. One example of such a passive component is a molded encapsulant or lens of a side-emitting packaged LED.

Any suitable side-emitting LED can be used for one or more light sources, e.g., Luxeon™ LEDs (available from Lumileds, San Jose, Calif.), or the LEDs described, e.g., in U.S. patent application Ser. No. 11/381,324 (Leatherdale et al.), entitled LED PACKAGE WITH CONVERGING OPTICAL ELEMENT; and U.S. patent application Ser. No. 11/381,293 (Lu et al.), entitled LED PACKAGE WITH WEDGE-SHAPED OPTICAL ELEMENT.

In some embodiments where the backlights are used in combination with a display panel (e.g., panel 650 of FIG. 6), the backlight 100 continuously emits white light, and the LC panel is combined with a color filter matrix to form groups of multicolored pixels (such as yellow/blue (YB) pixels, red/green/blue (RGB) pixels, red/green/blue/white (RGBW) pixels, red/yellow/green/blue (RYGB) pixels, red/yellow/green/cyan/blue (RYGCB) pixels, or the like) so that the displayed image is polychromatic. Alternatively, polychromatic images can be displayed using color sequential techniques, where, instead of continuously back-illuminating the LC panel with white light and modulating groups of multicolored pixels in the LC panel to produce color, separate differently colored light sources within the backlight 100 (selected, for example, from red, orange, amber, yellow, green, cyan, blue (including royal blue), and white in combinations such as those mentioned above) are modulated such that the backlight flashes a spatially uniform colored light output (such as, for example, red, then green, then blue) in rapid repeating succession. This color-modulated backlight is then combined with a display module that has only one pixel array (without any color filter matrix), the pixel array being modulated synchronously with the backlight to produce the whole gamut of achievable colors (given the light sources used in the backlight) over the entire pixel array, provided the modulation is fast enough to yield temporal color-mixing in the visual system of the observer. Examples of color sequential displays, also known as field sequential displays, are described in U.S. Pat. No. 5,337,068 (Stewart et al.) and U.S. Pat. No. 6,762,743 (Yoshihara et al.). In some cases, it may be desirable to provide only a monochrome display. In those cases the backlight 100 can include filters or specific sources that emit predominantly in one visible wavelength or color.

In some embodiments, e.g., direct-lit backlights such as the embodiment illustrated in FIG. 3, the light sources may be positioned on the back reflector; alternatively, the light sources may be spaced apart from the back reflector. In other embodiments, the light sources may include light sources that are positioned on or attached to the back reflector, e.g., as described in co-owned and copending U.S. patent application Ser. Nos. 11/018,608; 11/018,605; 11/018,961; and 10/858,539.

The light sources 160 may be positioned in any suitable arrangement. Further, the light sources 160 can include light sources that emit different wavelengths or colors of light. For example, the light sources may include a first light source that emits a first wavelength of illumination light, and a second light source that emits a second wavelength of illumination light. The first wavelength may be the same as or different from the second wavelength. The light sources 160 can also include a third light source that emits a third wavelength of light. See, e.g., U.S. Patent Application No. 60/939,083, entitled WHITE LIGHT BACKLIGHTS AND THE LIKE WITH EFFICIENT UTILIZATION OF COLORED LED SOURCES. In some embodiments, the various light sources 160 may produce light that, when mixed, provides white illumination light to a display panel or other device. In other embodiments, the light sources 160 may each produce white light.

Further, in some embodiments, light sources that at least partially collimate the emitted light may be preferred. Such light sources can include lenses, extractors, shaped encapsulants, or combinations thereof of optical elements to provide a desired output into the hollow light recycling cavity of the disclosed backlights. Exemplary extractors are described, e.g., in U.S. Patent Publication Nos. 2007/0257266; 2007/0257270; 2007/0258241; 2007/0258246; and U.S. Pat. No. 7,329,982.

Further, the backlights of the present disclosure can include injection optics that partially collimate or confine light initially injected into the recycling cavity to propagation directions close to a transverse plane (the transverse plane being parallel to the output area of the backlight), e.g., an injection beam having an average deviation angle from the transverse plane in a range from 0 to 45 degrees, or 0 to 30 degrees, or 0 to 15 degrees.

In some embodiments of the present disclosure it may be preferred that some degree of diffusion be provided within the hollow light recycling cavity. Such diffusion can provide more angular mixing of light within the cavity, thereby helping to spread the light within the cavity and provide greater uniformity in the light directed out of the cavity through the output surface. In other words, the recycling optical cavity contains a component that provides the cavity with a balance of specular and diffuse characteristics, the component having sufficient specularity to support significant lateral light transport or mixing within the cavity, but also having sufficient diffusivity to substantially homogenize the angular distribution of steady state light propagation within the cavity, even when injecting light into the cavity only over a narrow range of propagation angles. Additionally, recycling within the cavity must result in a degree of randomization of reflected light polarization relative to the incident light polarization state. This allows for a mechanism by which unusable polarization light can be converted by recycling into usable polarization light. The diffusion can be provided by one or both of the front and back reflectors, the side reflectors, or by one or more layers positioned between the front and back reflectors as is further described herein.

In some embodiments, the diffusion provided within the cavity can include semi-specular diffusion. As used herein, the term "semi-specular reflector" refers to a reflector that reflects substantially more forward scattering than reverse scattering. Similarly, the term "semi-specular diffuser" refers to a diffuser that does not reverse the normal component of the incident ray for a substantial majority of the incident light, i.e., the light is substantially transmitted in the forward (z) direction and scattered to some degree in the x and y directions. In other words, semi-specular reflectors and diffusers (collectively referred to as semi-specular elements) direct the light in a substantially forward direction and thus are very different from Lambertian components which redirect light rays equally in all directions. Semi-specular reflectors and diffusers can exhibit relatively wide scattering angles; alternatively, such reflectors and diffusers can exhibit only small amounts of light deflection outside the specular direction. See, e.g., U.S. Patent Application No. 60/939,085, entitled RECYCLING BACKLIGHTS WITH SEMI-SPECULAR COMPONENTS. Any suitable semi-specular material or materials can be used for the front and back reflectors of the present disclosure.

Further, for example, the semi-specular back reflectors can include a partially transmitting specular reflector on a high reflectance diffuser reflector. Suitable partially transmitting specular reflectors include any of the partially transmitting reflective films described herein, e.g., symmetric or asymmetric reflective films. Suitable high reflectance diffuse reflectors include EDR II film (available from 3M); porous polytetrafluoroethylene (PTFE) films, such as those available from W. L. Gore & Associates, Inc.; Spectralon™ reflectance material available from Labsphere, Inc.; MCPET high reflectivity foamed sheeting from Furukawa Electric Co., Ltd.; and White Refstar™ film available from Mitsui Chemicals, Inc.

In other embodiments, a semi-specular back reflector can include a partial Lambertian diffuser on a high reflectance specular reflector. Alternatively, a forward scattering diffuser on a high reflectance specular reflector can provide a semi-specular back reflector.

The front reflector can be made semi-specular with constructions that are similar to the back reflector. For example, a partial reflecting Lambertian diffuser can be combined with a partial specular reflector. Alternatively, a forward scattering diffuser can be combined with a partial specular reflector. Further, the front reflector can include a forward scattering partial reflector. In other embodiments, any of the above-described front reflectors can be combined to provide a semi-specular front reflector.

One or both of the front and back reflectors can be specular if a diffuser is placed somewhere in the cavity. One of the reflectors can also be Lambertian, but in general this is not an optimum construction, particularly for edge-lit backlights. In this case, the other reflector should be semi-specular or specular. The forward scattering diffusers can be any suitable diffuser and can be symmetric or asymmetric with respect to both direction or polarization state.

Quantitatively, the degree of semi-specularity (specular vs. Lambertian characteristic of a given reflector or other component) can be effectively characterized by comparing the fluxes of the forward- and back-scattered light components, referred to as F and B respectively. The forward and back-scattered fluxes can be obtained from the integrated reflection intensities (or integrated transmission intensities in the case of optically transmissive components) over all solid angles. The degree of semi-specularity can then be characterized by a "transport ratio" T, given by: $T=(F-B)/(F+B)$.

T ranges from 0 to 1 as one moves from purely Lambertian to purely specular. For a pure specular reflector there is no back-scatter (B=0), and therefore T=F/F=1. For a pure Lambertian reflector, the forward- and back-scattered fluxes are the same (F=B), and thus T=0. Examples with experimentally measured values are given below. The transport ratio for any real reflective or transmissive component is a function of incidence angle. This is logical, because one would expect the amount of forward-scattered light, for example, to be different for a near-normally incident ray than for a grazing-incident ray.

In connection with a recycling cavity, one can define an "effective cavity transport ratio", i.e., the transport ratio experienced by a given incident ray after a complete circuit or cycle of the recycling cavity. This quantity may be of interest, particularly in cavities that contain at least one semi-specular component and at least one additional scattering component (whether semi-specular or Lambertian). Since transport ratio is in general a function of incidence angle, one could evaluate or specify the effective cavity transport ratio in terms of a characteristic or average incidence angle of light injected into the cavity, e.g., the average power flux deviation angle of the light source(s). See, e.g., U.S. Patent Application No. 60/939,085 for further discussion of transport ratio.

Although not shown in FIG. 1, the backlight 100 (or display system 600 of FIG. 6) can include a light sensor and feedback system to detect and control one or both of the brightness and color of light from the light sources 160. For example, a sensor can be located near individual light sources 160 or clusters of sources to monitor output and provide feedback to control, maintain, or adjust a white point or color temperature. It may be beneficial to locate one or more sensors along an edge or within the cavity 130 to sample the mixed light. In some instances it may be beneficial to provide a sensor to detect ambient light outside the display in the viewing environment, for example, the room that the display is in. Control logic can be used to appropriately adjust the output of the light sources 160 based on ambient viewing conditions. Any suitable sensor or sensors can be used, e.g., light-to-frequency or light-to-voltage sensors (available from Texas Advanced Optoelectronic Solutions, Plano, Tex.). Additionally, thermal sensors can be used to monitor and control the output of light sources 160. Any of these techniques can be used to adjust light output based on operating conditions and compensation for component aging over time. Further, sensors can be used for dynamic contrast, vertical scanning or horizontal zones, or field sequential systems to supply feedback signals to the control system.

The output surface 135 of the backlight 100 can include any suitable area in relation to the area of the cavity 130. For example, in some embodiments, the output surface 135 can be smaller in area than the area (L×W) of the cavity 130. This can be accomplished, e.g., using a front reflector 110 that has a portion that is highly reflective, thereby reducing the effective area of the output surface 135. A reduced output surface area can increase the brightness provided by the backlight for a given input flux from the light sources 160.

As mentioned herein, some backlights of the present disclosure can include one or more light sources positioned at one or more edges of the backlight to form an edge-lit backlight. For example, FIG. 2 is a schematic cross-section view of another embodiment of an edge-lit backlight 200. The backlight 200 includes a partially transmissive front reflector 210 and a back reflector 220 that form a hollow light recycling cavity 230 that includes an output surface 235. As is further described herein, cavity 230 further includes at least one light extraction element (in FIG. 2, elements 242, 244 and 246) having a gradient specularity. The backlight 200 also includes a semi-specular element 250 disposed within the hollow light recycling cavity 230, and at least two light sources 260, 270 disposed to emit light into the light recycling cavity 230. The light sources 260, 270 are configured to emit light into the light recycling cavity 230 over a limited angular range. All of the design considerations and possibilities described herein regarding the front reflector 110, back reflector 120, semi-specular element 250, and one or more light sources 160 of backlight 100 of FIG. 1 apply equally to the front reflector 210, the back reflector 220, the light extraction elements 242, 244, 246, the semi-specular element 250, and the light sources 260, 270 of the backlight 200 of FIG. 2.

In the embodiment illustrated in FIG. 2, the one or more light sources 260, 270 are disposed proximate first edge 232 and second edge 234 of the backlight 200, respectively. In other embodiments, light sources can be disposed proximate any number of edges of the backlight. As illustrated, backlight 200 includes a pair of injectors or reflectors 265, 275 that helps to direct light from the one or more light sources 260, 270 into the light recycling cavity 230. Any suitable injector or reflector can be used with the backlight 200, e.g., wedges, parabolic reflectors, etc. See, e.g., the injectors described in U.S. Patent Application No. 60/939,082, entitled COLLIMATING LIGHT INJECTORS FOR EDGE-LIT BACKLIGHTS.

In the illustrated embodiment, the light extraction element is separated into three segments (242, 244, 246) with second portions 248, 249 of the back reflector 220 between them. In some embodiments, as shown in FIG. 1, light extractor element 140 is continuous across the length L of the backlight 100. In some embodiments, as shown in FIG. 2, light extraction element (242, 244, 246) is discontinuous across the length L of the backlight 200, In some embodiments, not shown, the light extraction element can be further divided into segments across the length and width of a backlight, to provide the desired light flux output from the output surface.

Although backlight 200 of FIG. 2 is an edge-lit backlight having one or more light sources positioned proximate edges of the backlight, other embodiments can include light sources positioned to direct light into the light recycling cavity within the area of cavity defined by the projection of the output surface onto the back reflector, thereby forming a direct-lit backlight. For example, FIG. 3 is a schematic cross-section view of one embodiment of a direct-lit backlight 300. The backlight 300 includes a partially transmissive front reflector 310 and a back reflector 320 that form a hollow light recycling cavity 330 having an output surface 335. The backlight 300 also includes at least one semi-specular element (not shown) disposed within the hollow light recycling cavity 330, a light extraction element 340 having a gradient specularity, and one or more light sources 360, 370 disposed to emit light into the light recycling cavity 330. In the embodiment illustrated in FIG. 3, the light extraction element 340 is shown adjacent partially transmissive front reflector 310; however the light extraction element 340 can be placed at other positions in cavity 330, as described elsewhere. All of the design considerations and possibilities described herein regarding the front reflector 110, the back reflector 120, the light extraction element 140 having a gradient specularity, the at least one semi-specular element 150, and the one or more light sources 160 of the backlight 100 of FIG. 1 apply equally to the front reflector 310, the back reflector 320, the light extraction element 340 having a gradient specularity, the at least one semi-specular element, and the one or more light sources 360, 370 of the backlight 300 of FIG. 3.

In the embodiment illustrated in FIG. 3, the one or more light sources 360, 370 are positioned within the light recycling cavity 330. In some embodiments, the light sources 360, 370 are configured to emit light in a substantially sideways direction such that the emitted light has an average flux deviation angle relative to a transverse plane defined by the output surface 335 in a range of 0 to 40 degrees. In other words, the light sources 360, 370 can be configured to emit a substantial portion of light into the transport zone of the cavity 330. The one or more light sources 360, 370 can be positioned in any suitable location within the cavity 330.

In some direct-lit embodiments, generally vertical reflective side surfaces 332, 334 may actually be thin partitions that separate the backlight from similar or identical neighboring backlights, where each such backlight is actually a portion of a larger zoned backlight. Light sources in the individual sub-backlights can be turned on or off in any desired combination to provide patterns of illuminated and darkened zones for the larger backlight. Such zoned backlighting can be used dynamically to improve contrast and save energy in some LCD applications. The reflective partitions between zones may not extend completely to the front reflector, but may be separated therefrom by a gap that is sized to minimize the visibility of zone boundaries (from the perspective of a viewer) while also minimizing zone-to-zone bleedthrough.

FIGS. 5a-5f schematic cross-section views of various embodiments of edge-lit hollow backlights, according to one aspect of the disclosure. In FIGS. 5a-5f, backlight 500 includes a partially transmissive front reflector 510 and a back reflector 520 that form a hollow light recycling cavity 530. Partially transmissive front reflector 510 includes a major surface 512 that faces the back reflector 520. Back reflector 520 includes a major surface 522 that faces the partially transmissive front reflector 510. Backlight 530 further includes one or more light sources (not shown), similar to those described elsewhere.

Figure 5A:
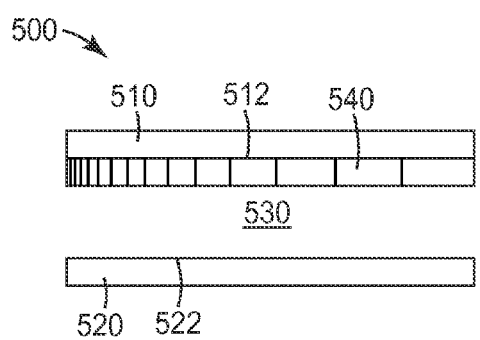
FIGS. 5a-5f are schematic cross-section views of various embodiments of edge-lit hollow backlights.

In FIG. 5a, backlight 500 includes an optical element 540 disposed adjacent the major surface 512 of partially transmissive front reflector 510. Optical element 540 is a semi-specular element that is combined with a light extraction element having gradient specularity.

Figure 5B:
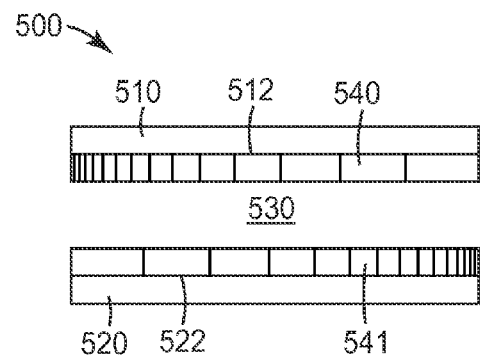

In FIG. 5b, backlight 500 includes a first optical element 540 disposed adjacent the major surface 512 of partially transmissive front reflector 510, and a second optical element 541 disposed adjacent the major surface 522 of back reflector 520. First and second optical elements 540, 541 are semi-specular elements that are combined with light extraction elements having a gradient specularity. As depicted in FIG. 5b, the gradient specularity within each of the optical elements can be different, or it can be the same.

Figure 5C:
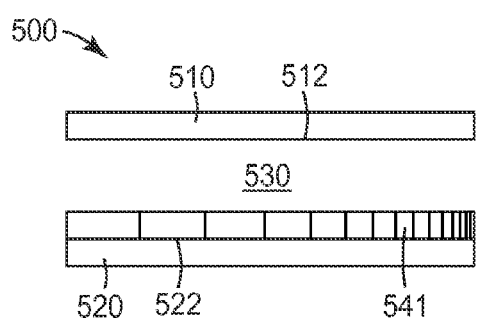

In FIG. 5c, backlight 500 includes an optical element 541 disposed adjacent the major surface 522 of back reflector 520. Optical element 541 is a semi-specular element that is combined with a light extraction element having gradient specularity.

Figure 5D:
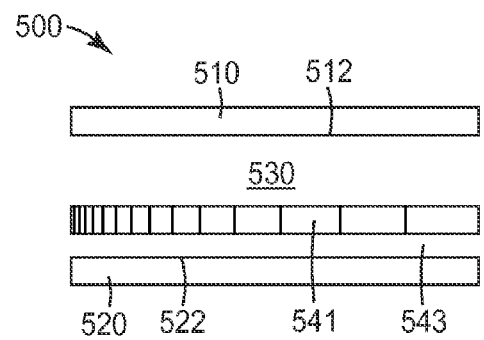

In FIG. 5d, backlight 500 includes an optical element 541 separated by a gap 543 from the major surface 522 of back reflector 520. Optical element 541 is a semi-specular element that is combined with a light extraction element having gradient specularity.

Figure 5E:
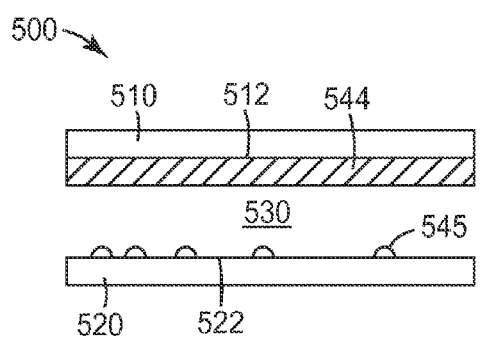

In FIG. 5e, backlight 500 includes a semi-specular element 544 disposed adjacent the major surface 512 of partially transmissive front reflector 510, and a gradient light extractor comprising light extraction elements 545 disposed in a gradient on major surface 522 of back reflector 520.

Figure 5F:
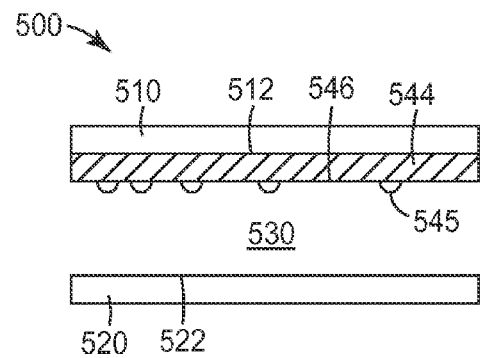

In FIG. 5f, backlight 500 includes a semi-specular element 544 disposed adjacent the major surface 512 of partially transmissive front reflector 510. Semi-specular element 544 has a major surface 546 facing back reflector 520, and a gradient light extractor comprising light extraction elements 545 disposed in a gradient on major surface 546 of semi-specular element 544.

All of the design considerations and possibilities described herein regarding the front reflector 110, the back reflector 120, the light extraction element 140 having a gradient specularity, the at least one semi-specular element 150, and the one or more light sources 160 of the backlight 100 of FIG. 1 apply equally to the front reflector 510, the back reflector 520, the light extraction elements having a gradient specularity, the at least one semi-specular element, and the one or more light sources of the backlight 500 of FIGS. 5a-5f.

Figure 6:
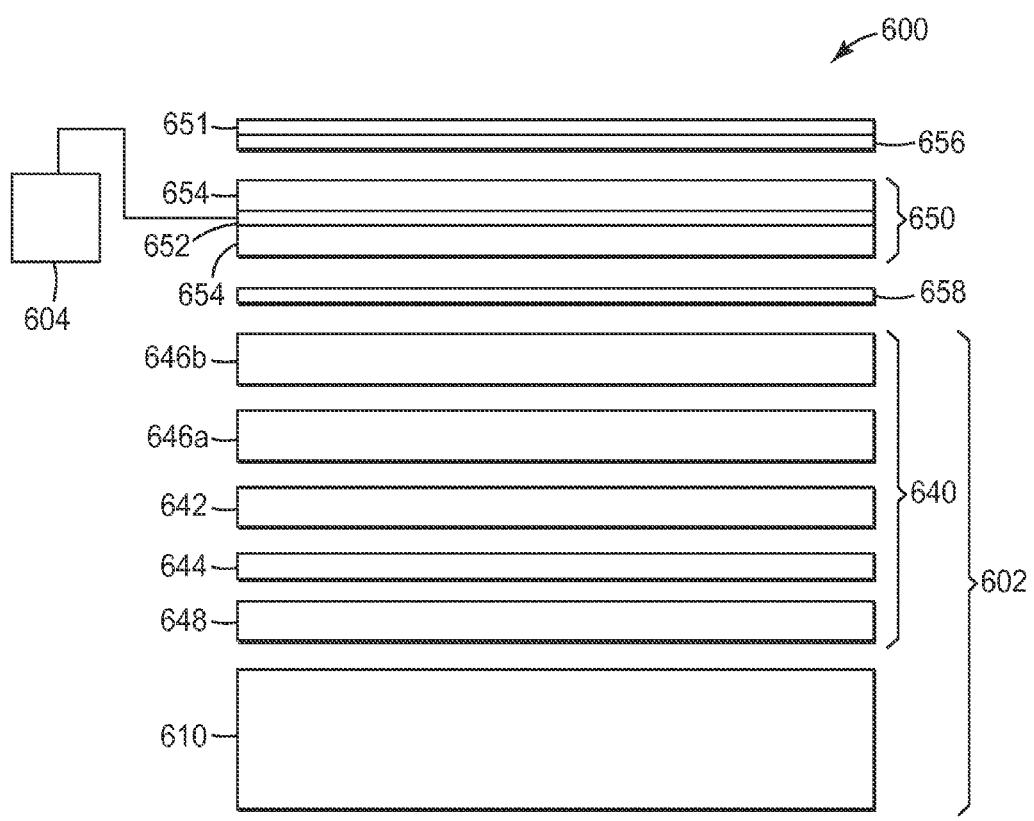
FIG. 6 is a schematic cross-section view of one embodiment of a display system.

The backlights of the present disclosure can be implemented in any suitable configuration or application. For example, the backlights described herein can be used with a display panel to form a display system, e.g., an LC display or monitor. FIG. 6 is a schematic cross-section view of one embodiment of a display system 600. The display system 600 includes an LC panel 650 and an illumination assembly 602 disposed to provide light to the LC panel 650. The LC panel 650 typically includes a layer of LC 652 disposed between panel plates 654. The plates 654 are often formed of glass and may include electrode structures and alignment layers on their inner surfaces for controlling the orientation of the liquid crystals in the LC layer 652. These electrode structures are commonly arranged so as to define LC panel pixels, i.e., areas of the LC layer where the orientation of the liquid crystals can be controlled independently of adjacent areas. A color filter may also be included with one or more of the plates 652 for imposing color on the image displayed by the LC panel 650.

The LC panel 650 is positioned between an upper absorbing polarizer 656 and a lower absorbing polarizer 658. In the illustrated embodiment, the upper and lower absorbing polarizers 656, 658 are located outside the LC panel 650. The absorbing polarizers 656, 658 and the LC panel 650 in combination control the transmission of light from a backlight 610 through the display system 600 to the viewer. For example, the absorbing polarizers 656, 658 may be arranged with their transmission axes perpendicular to each other. In an unactivated state, a pixel of the LC layer 652 may not change the polarization of light passing therethrough. Accordingly, light that passes through the lower absorbing polarizer 658 is absorbed by the upper absorbing polarizer 656. When the pixel is activated, the polarization of the light passing therethrough is rotated so that at least some of the light that is transmitted through the lower absorbing polarizer 658 is also transmitted through the upper absorbing polarizer 656. Selective activation of the different pixels of the LC layer 652, for example, by a controller 604, results in the light passing out of the display system 600 at certain desired locations, thus forming an image seen by the viewer. The controller 604 may include, for example, a computer or a television controller that receives and displays television images.

One or more optional layers 657 may be provided proximate the upper absorbing polarizer 656, for example, to provide mechanical and/or environmental protection to the display surface. In one exemplary embodiment, the layer 657 may include a hardcoat over the upper absorbing polarizer 656.

It will be appreciated that some types of LC displays may operate in a manner different from that described above. For example, the absorbing polarizers may be aligned parallel and the LC panel may rotate the polarization of the light when in an unactivated state. Regardless, the basic structure of such displays remains similar to that described above.

The illumination assembly 602 includes a backlight 610 and optionally one or more light management films 640 positioned between the backlight 610 and the LC panel 650. The backlight 610 can include any backlight described herein, e.g., backlight 100 of FIG. 1.

An arrangement of light management films 640, which may also be referred to as a light management unit, is positioned between the backlight 610 and the LC panel 650. The light management films 640 affect the illumination light propagating from the backlight 610. For example, the arrangement of light management films 640 may optionally include a diffuser 648. The diffuser 648 is used to diffuse the light received from the backlight 610.

The diffuser layer 648 may be any suitable diffuser film or plate. For example, the diffuser layer 648 can include any suitable diffusing material or materials. In some embodiments, the diffuser layer 648 may include a polymeric matrix of polymethyl methacrylate (PMMA) with a variety of dispersed phases that include glass, polystyrene beads, and $CaCO_3$ particles. Exemplary diffusers can include 3M™ Scotchcal™ Diffuser Film, types 3635-30, 3635-70, and 3635-100, available from 3M Company, St. Paul, Minn.

The optional light management films 640 may also include a reflective polarizer 642. In some embodiments, the transmission axis of the reflective polarizer 642 can be aligned with the pass axis of the LC panel 650. Any suitable type of reflective polarizer may be used for the reflective polarizer 642, e.g., multilayer optical film (MOF) reflective polarizers; diffusely reflective polarizing film (DRPF), such as continuous/disperse phase polarizers; wire grid reflective polarizers; or cholesteric reflective polarizers.

Both the MOF and continuous/disperse phase reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774 (Jonza et al.). Commercially available examples of MOF reflective polarizers include Vikuiti™ DBEF-D200 and DBEF-D440 multilayer reflective polarizers that include diffusive surfaces, available from 3M Company.

Examples of DRPF useful in connection with the present disclosure include continuous/disperse phase reflective polarizers as described, e.g., in co-owned U.S. Pat. No. 5,825,543 (Ouderkirk et al.), and diffusely reflecting multilayer polarizers as described, e.g., in co-owned U.S. Pat. No. 5,867,316 (Carlson et al.). Other suitable types of DRPF are described in U.S. Pat. No. 5,751,388 (Larson).

Some examples of wire grid polarizers useful in connection with the present disclosure include those described, e.g., in U.S. Pat. No. 6,122,103 (Perkins et al.). Wire grid polarizers are commercially available from, inter alia, Moxtek Inc., Orem, Utah.

Some examples of cholesteric polarizers useful in connection with the present disclosure include those described, e.g., in U.S. Pat. No. 5,793,456 (Broer et al.), and U.S. Patent Publication No. 2002/0159019 (Pokorny et al.). Cholesteric polarizers are often provided along with a quarter wave retarding layer on the output side so that the light transmitted through the cholesteric polarizer is converted to linearly polarized light.

In some embodiments, a polarization control layer 644 may be provided between the diffuser plate 648 and the reflective polarizer 642. Examples of polarization control layers 644 include a quarter wave retarding layer and a polarization rotating layer such as a liquid crystal polarization rotating layer. The polarization control layer 644 may be used to change the polarization of light that is reflected from the reflective polarizer 642 so that an increased fraction of the recycled light is transmitted through the reflective polarizer 642.

The optional arrangement of light management films 640 may also include one or more brightness enhancing layers. A brightness enhancing layer is one that includes a surface structure that redirects off-axis light in a direction closer to the axis of the display. This increases the amount of light propagating on-axis through the LC layer 652, thus increasing the brightness of the image seen by the viewer. One example of a brightness enhancing layer is a prismatic brightness enhancing layer, which has a number of prismatic ridges that redirect the illumination light through refraction and reflection. Examples of prismatic brightness enhancing layers that may be used in the display system 600 include the Vikuiti™ BEF II and BEF III family of prismatic films available from 3M Company, including BEF II 90/24, BEF II 90/50, BEF HIM 90/50, and BEF HIT. In some embodiments, a polarization preserving refractive structure or structures can be utilized. Many types of refractive brightness enhancement films are highly birefringent and can depolarize the light emitted from the reflective polarizer. Substrates such as polycarbonate can be made to be sufficiently isotropic so as not to depolarize.

Brightness enhancement may also be provided by some of the embodiments of front reflectors as is further described herein.

The exemplary embodiment illustrated in FIG. 6 shows a first brightness enhancing layer 646a disposed between the reflective polarizer 642 and the LC panel 650. A prismatic brightness enhancing layer typically provides optical gain in one dimension. An optional second brightness enhancing layer 646b may also be included in the arrangement of light management films 640, having its prismatic structure oriented orthogonally to the prismatic structure of the first brightness enhancing layer 646a. Such a configuration provides an increase in the optical gain of the display system 600 in two dimensions. In other exemplary embodiments, the brightness enhancing layers 646a, 646b may be positioned between the backlight 610 and the reflective polarizer 642. The different layers in the optional light management films 640 may be free standing.

In other embodiments, two or more of the layers in the light management films 640 may be laminated together, for example as discussed in co-owned U.S. patent application Ser. No. 10/966,610 (Ko et al.). In other exemplary embodiments, the optional light management films 640 may include two subassemblies separated by a gap, for example, as described in co-owned U.S. patent application Ser. No. 10/965,937 (Gehlsen et al.).

In one aspect, one or both of the front and back reflectors of the backlights of the present disclosure can be positioned or shaped to provide a desired output light flux distribution. In another aspect, one or more light extraction elements can be positioned within the cavity to provide a desired output light flux distribution. Any suitable technique can be used to determine what shape or position the reflectors or light extraction elements should take to provide the desired distribution. For example, a hollow light recycling cavity having an output surface can be formed. The cavity can include a partially transmissive front reflector and a planar back reflector. One or more light sources can be positioned to emit light into the light recycling cavity over a limited angular range. A desired output light flux distribution can be selected. A first output light flux distribution can be measured and compared to the desired output light flux distribution. In one aspect, one or both of the front and back reflectors can then be shaped or positioned to provide the desired output light flux distribution. In another aspect, a light extraction element can be positioned within the cavity to provide the desired output light flux distribution. In yet another aspect, one or both of the front and back reflectors can then be shaped or positioned, and a extraction element can be positioned within the cavity to provide the desired output light flux distribution. A second output light flux distribution can be measured and compared to the desired output light flux distribution. Further shaping, forming, or positioning of one or both of the front and back reflectors, or changing the gradient specularity or position of the light extraction element, can then be performed to provide the desired output light flux distribution. Any or all of the above-mentioned techniques can also be performed using any suitable computer modeling technique known in the art.

Unless otherwise indicated, references to "backlights" are also intended to apply to other extended area lighting devices that provide nominally uniform illumination in their intended application. Such other devices may provide either polarized or unpolarized outputs. Examples include light boxes, signs, channel letters, and general illumination devices designed for indoor (e.g. home or office) or outdoor use, sometimes referred to as "luminaires." Note also that edge-lit devices can be configured to emit light out of both opposed major surfaces—i.e., both out of the "front reflector" and "back reflector" referred to above—in which case both the front and back reflectors are partially transmissive. Such a device can illuminate two independent LCD panels or other graphic members placed on opposite sides of the backlight. In that case the front and back reflectors may be of the same or similar construction. Such two-sided backlights can be used, e.g., for double-sided signs, cell phones, etc. In some embodiments, a two-sided backlight can include a reflective member positioned within the cavity to direct light out of one or both major surfaces of the backlight. This reflective member can be fully reflective, partially transmissive, or can have a combination of reflective and transmissive properties. Further, one or both major surfaces of the reflective member can be shaped as is described herein. Any suitable reflector can be used for the reflective member.

The term "LED" refers to a diode that emits light, whether visible, ultraviolet, or infrared. It includes incoherent encased or encapsulated semiconductor devices marketed as "LEDs," whether of the conventional or super radiant variety. If the LED emits non-visible light such as ultraviolet light, and in some cases where it emits visible light, it is packaged to include a phosphor (or it may illuminate a remotely disposed phosphor) to convert short wavelength light to longer wavelength visible light, in some cases yielding a device that emits white light.

Phosphors can be mixtures of fluorescent material in a binder. The fluorescent material could be inorganic particles, organic particles, or organic molecules or a combination thereof. Suitable inorganic particles include doped garnets (such as YAG:Ce and (Y,Gd)AG:Ce), aluminates (such as $Sr_2Al_{14}O_{25}$:Eu, and BAM:Eu), silicates (such as SrBaSiO:Eu), sulfides (such as ZnS:Ag, CaS:Eu, and $SrGa_2S_4$:Eu), oxy-sulfides, oxy-nitrides, phosphates, borates, and tungstates (such as $CaWO_4$). These materials may be in the form of conventional phosphor powders or nanoparticle phosphor powders. Another class of suitable inorganic particles is the so-called quantum dot phosphors made of semiconductor nanoparticles including Si, Ge, CdS, CdSe, CdTe, ZnS, ZnSe, ZnTe, PbS, PbSe, PbTe, InN, InP, InAs, AlN, AlP, AlAs, GaN, GaP, GaAs and combinations thereof. Generally, the surface of quantum dot will be at least partially coated with an organic molecule to prevent agglomeration and increase compatibility with the binder. In some cases the semiconductor quantum dot may be made up of several layers of different materials in a core-shell construction. Suitable organic molecules include fluorescent dyes such as those listed in U.S. Pat. No. 6,600,175. Preferred fluorescent materials are those that exhibit good durability and stable optical properties. The phosphor layer may consist of a blend of different types of phosphors in a single layer or a series of layers, each containing one or more types of phosphors. The inorganic phosphor particles in the phosphor layer may vary in size (diameter) and they may be segregated such that the average particle size is not uniform across the cross-section of the layer. For example, the larger particles may tend to be on one side of the film while the smaller particles may tend to be located on the other side. This segregation could be accomplished by allowing the particles to settle before the binder is cured. Other suitable phosphors include thin film phosphors, e.g., Lumiramic™ phosphor technology, available from Lumileds, San Jose, Calif.

An "LED die" is an LED in its most basic form, i.e., in the form of an individual component or chip made by semiconductor processing procedures. The component or chip can include electrical contacts suitable for application of power to energize the device. The individual layers and other functional elements of the component or chip are typically formed on the wafer scale, and the finished wafer can then be diced into individual piece parts to yield a multiplicity of LED dies. An LED may also include a cup-shaped reflector or other reflective substrate, encapsulating material formed into a simple dome-shaped lens or any other known shape or structure, extractor(s), and other packaging elements, which elements may be used to produce a forward-emitting, side-emitting, or other desired light output distribution.

Unless otherwise indicated, references to LEDs are also intended to apply to other sources capable of emitting bright light, whether colored or white, and whether polarized or unpolarized, in a small emitting area. Examples include semiconductor laser devices, and sources that utilize solid state laser pumping, solid state light sources that incorporate photonic crystals, e.g., Phlatlight™ light sources, available from Luminus Devices, Inc. Billerica, Mass., and sources that incorporate quantum well down-converting elements such as quantum dots or quantum wells (see, e.g., U.S. Patent Application No. 60/978,304; and U.S. Patent Publication No. 2006/0124918).

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

EXAMPLES

Backlights were modeled using LightTools® 6.0.0 (available from Optical Research Associates, Pasadena, Calif.) and a Virtual Backlight simulation tool, such as described in PCT Patent Application No. US2008/068953 entitled VIRTUAL BACKLIGHT FRAMEWORK.

Example 1

Edgelit Backlight

A 32" (81.3 cm) diagonal 16:9 backlight was modeled. The backlight was designed similar to FIG. 1 with the following dimensions: length L was 398.5 mm, height H was 15.0 mm, the parabolic reflector (element 165 in FIG. 1) measured 21 mm deep and 14 mm wide (depth is the distance to the left, and width is opening along edge 132), and the light source 160 measured 2.6 mm. The side reflector (element 134 in FIG. 1) was tilted about 3.8° from the vertical (the end nearest element 110 is closer to the light source). A beaded gain diffuser (prepared according to the procedure described in Example F of copending U.S. Patent Application No. 60/939,085, entitled RECYCLING BACKLIGHTS WITH SEMI-SPECULAR COMPONENTS), was used as a semi-specular element (element 150 in FIG. 1). All other interior surfaces of the light engine and cavity were lined with ESR, available from 3M company, unless otherwise specified. Simulations without light extraction elements were run, using two different partially transmissive front reflectors (element 110 in FIG. 1). The first partially transmissive front reflector (designated as ARF) was an Asymmetric Reflecting Film (ARF) having 32% transmission in the pass-direction, and a hemispherical reflectivity of 83%. The second partially transmissive front reflector (designated as APF) was an Advanced Polarizing Film having a hemispherical reflectivity of 51%.

A two segment light extraction element was placed in the cavity, adjacent the back reflector as depicted in FIG. 1. Each of the two segments of light extraction element included white dots with varied density and lambertian scattering property applied on the back reflector. The white dot patterns used in the simulations were calculated using the "Bezier Placement Option" in LightTools® 6.0.0 from Optical Research Associate. The first segment of light extractors was 50 mm in length, and was next to the light source (starting at element 132 in FIG. 1 and extending 50 mm). The second segment of light extractors was 200 mm in length, and covered the back reflector from the midpoint to the side reflector (element 134 in FIG. 1). Each of the white dots was a Lambertian reflector having a reflectivity of 0.98. The white dots were placed in the array for each segment as indicated Table 1. The placement along the length direction L was determined by the Bezier placement option using the parameters indicated with an asterisk (*).

TABLE 1

|  | First Segment | Second Segment |
|---|---|---|
| Number of dots along L direction* | 40 | 300 |
| Number of dots along W direction | 10 | 15 |
| Dot separation along W direction | 0.58 mm | 0.38 mm |
| Position* | 0.0 | 7.908 |
| Cell* | 22.62 | 0.0 |
| Weight* | 0.5 | 0.5 |
| Dots Radius* | 0.15 mm | 0.15 mm |

Figure 7:
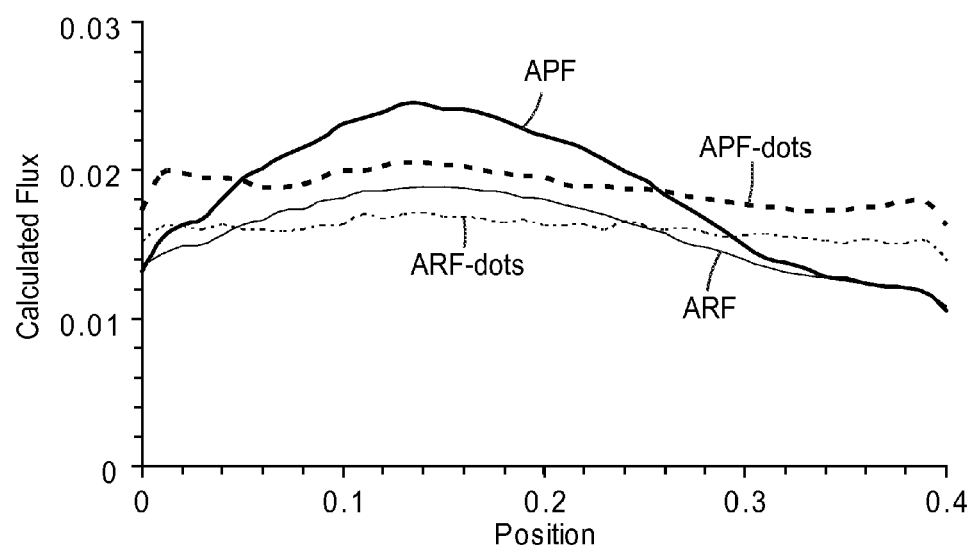
FIG. 7 is a graph of modeled output light flux versus position.

Simulations with the light extraction elements were run, using two different partially transmissive front reflectors (element 110 in FIG. 1). The first partially transmissive front reflector was an Asymmetric Reflecting Film (ARF) having 32% transmission in the pass-direction, and a hemispherical reflectivity of 83% (designated ARF-dots). The second partially transmissive front reflector was an Advanced Polarizing Film having a hemispherical reflectivity of 51% (designated APF-dots). FIG. 7 is a graph of the modeled output light flux versus position from the light source, including results from the ARF, ARF-dots, APF, and APF-dots simulations.

The simulation results demonstrate that a light extraction element having white print dots with lambertian scattering can improve display uniformity. The display uniformity was improved for partially transmissive front reflectors having both low and high hemispherical reflectivity. The efficiency of the backlight was also improved by the use of a partially transmissive front reflector having a lower hemispherical reflectivity, in part due to less recycling (and therefore less absorptive losses) inside the hollow cavity.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A backlight, comprising:
a partially transmissive front reflector and a back reflector that form a hollow light recycling cavity comprising an output surface;
a semi-specular element disposed within the hollow light recycling cavity;
a light extraction element disposed within the hollow light recycling cavity, wherein the light extraction element has a gradient specularity;
a first light source disposed to inject light into the hollow light recycling cavity,
wherein the output surface defines a transverse plane, and the first light source injects light into the hollow light recycling cavity with an average flux deviation angle relative to the transverse plane in a range from 0 to 45 degrees.

2. The backlight of claim 1 further comprising a second light source disposed to inject light into the hollow light recycling cavity, wherein at least one of the first light source and the second light source is disposed to inject light into an edge of the hollow light recycling cavity.

3. The backlight of claim 1, wherein the light injected into the hollow light recycling cavity is radially symmetrical about an emission axis.

4. The backlight of claim 1, wherein the back reflector is partially transmissive.

5. A luminaire comprising the backlight of claim 1.

6. The luminaire of claim 5, wherein the backlight is configured to emit light out of the partially transmissive front reflector and out of the back reflector.

7. The backlight of claim 1, wherein the front reflector and the back reflector are non-parallel.

8. The backlight of claim 1, wherein at least one of the front reflector and the back reflector are non-planar.

9. The backlight of claim 1, further comprising a light injector disposed to direct light from the first light source into the hollow light recycling cavity.

10. The backlight of claim 9, wherein the light injector comprises a light wedge, a parabolic reflector, or a lens.

11. The backlight of claim 1, wherein the first light source comprises a blue LED.

12. The backlight of claim 1, wherein the first light source is a multicolored light source comprising multiple LED dies.

13. The backlight of claim 1, wherein the partially transmissive front reflector comprises a layer having a surface structure that redirects light.

14. The backlight of claim 13, wherein the layer having the surface structure comprises a prism film.

15. The backlight of claim 1, wherein the partially transmissive front reflector comprises an asymmetric reflective film.

16. The backlight of claim 1, wherein the partially transmissive front reflector has a reflectivity that increases with angle of incidence.

17. The backlight of claim 1, further comprising a down converting material disposed within the hollow light recycling cavity.

18. The backlight of claim 17, wherein the light extraction element comprises the down converting material.

19. The backlight of claim 1, wherein the first light source comprises a down converting material.

20. The backlight of claim 1, wherein the light extraction element comprises a perforated film.

* * * * *

UNITED STATES PATENT AND TRADEMARK OFFICE
CERTIFICATE OF CORRECTION

| | | |
|---|---|---|
| PATENT NO. | : 8,807,774 B2 | Page 1 of 1 |
| APPLICATION NO. | : 14/024926 | |
| DATED | : August 19, 2014 | |
| INVENTOR(S) | : John Wheatley | |

It is certified that error appears in the above-identified patent and that said Letters Patent is hereby corrected as shown below:

In The Specification

Column 1
Line 8, Delete "Oct. 12, 2009;" and insert -- Apr. 19, 2011; --, therefor.

Column 28
Line 41, Delete "FRAMEWORK." and insert -- FRAMEWORK (Attorney Docket No. 62307WO004). --, therefor.

Signed and Sealed this
Twenty-first Day of July, 2015

Michelle K. Lee
*Director of the United States Patent and Trademark Office*